(12) United States Patent
Takayama

(10) Patent No.: US 6,624,959 B1
(45) Date of Patent: Sep. 23, 2003

(54) TAPE DRIVING APPARATUS AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,305

(22) Filed: Dec. 9, 1999

(30) Foreign Application Priority Data

Dec. 9, 1998 (JP) .......................................... 10-349674

(51) Int. Cl.⁷ .............................................. G11B 19/02
(52) U.S. Cl. ...................................... 360/69; 360/72.2
(58) Field of Search .................................. 360/69, 72.2

(56) References Cited

U.S. PATENT DOCUMENTS

| | | | |
|---|---|---|---|
| 4,411,008 A | * 10/1983 | d'Alayer de Costemore d'Arc et al. ............................... | 377/18 |
| 5,774,288 A | * 6/1998 | Kikuchi et al. ............... | 360/48 |
| 6,043,948 A | * 3/2000 | Takayama .................... | 360/69 |
| 6,307,700 B1 | * 10/2001 | Takayama ................. | 360/72.2 |
| 2002/0012525 A1 | * 1/2002 | Yuen et al. ................... | 386/69 |

FOREIGN PATENT DOCUMENTS

JP        10144064 A    *  5/1998

* cited by examiner

*Primary Examiner*—David Hudspeth
*Assistant Examiner*—Mitchell Slavitt
(74) *Attorney, Agent, or Firm*—Jay H. Maioli

(57) ABSTRACT

A tape driving apparatus and a recording medium, which is capable of reducing time in ejecting or replacing the recording medium and of maintaining accuracy, whereby is possible to load/unload a magnetic tape and to adequately manage it by setting a large number of partitions on the magnetic tape by storing management information in a memory within the recording medium. Then, it is possible to confirm whether or not the tape is adequately loaded by discriminating whether or not the tape is loaded correctly at the previous unloading position in loading the tape, so that the adequate recording/reproducing operation may be realized thereafter. Thereby, the time required for ejecting or replacing the recording medium may be remarkably shortened and the reliability of the driving operation with respect to the recording medium may be improved.

2 Claims, 20 Drawing Sheets

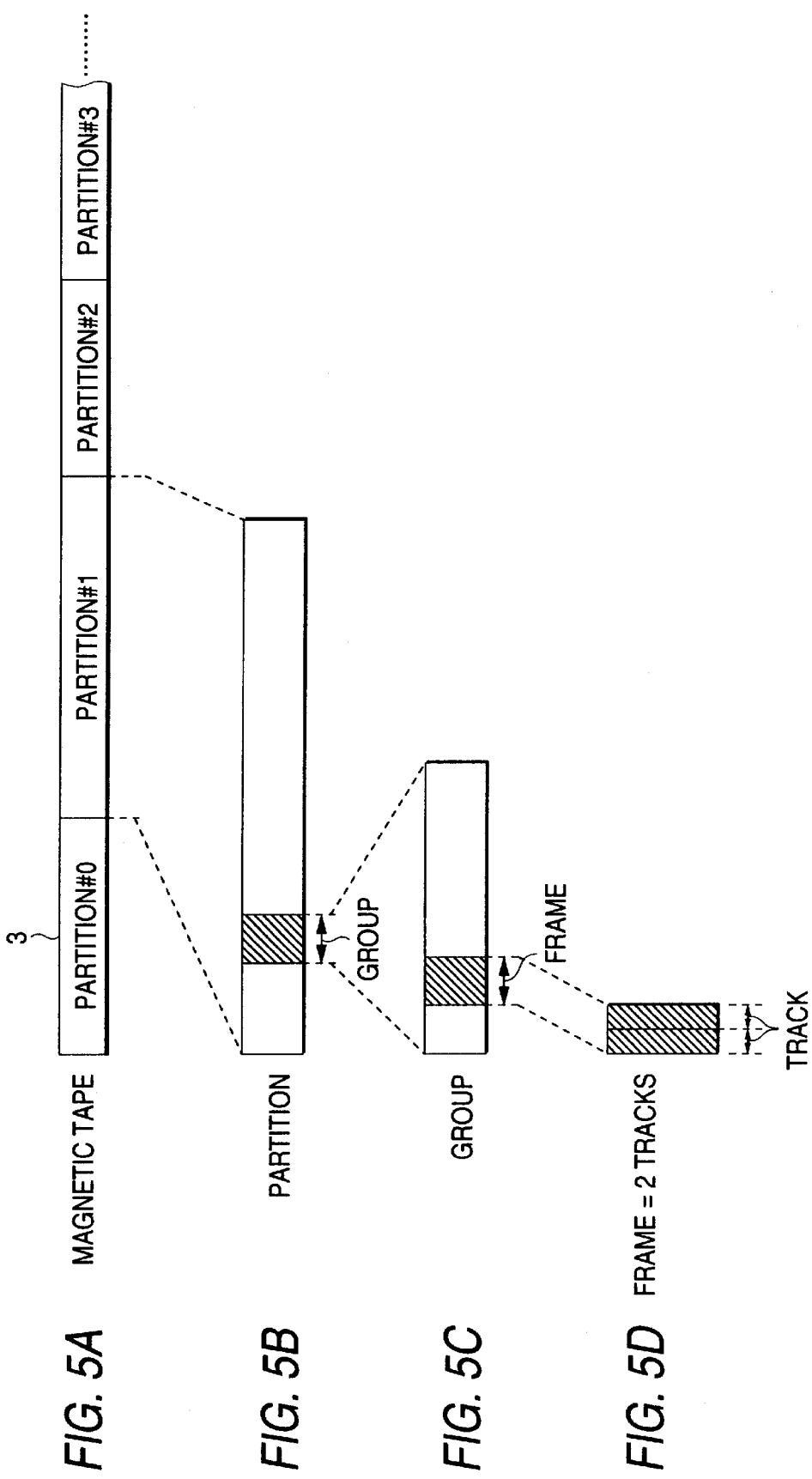

ID STRUCTURE

PHYSICAL BLOCK ADDRESS NUMBER ON A TRACK

| 0 | 1 | 2 | 3 | ............ | 382 | 383 |

FIG. 10

ID AREA INFORMATION

| RAW FORMAT ID | | 16 BITS |
|---|---|---|
| LOGICAL FORMAT ID | | 8 BITS |
| LOGICAL FRAME ID | LAST FRAME ID | 1 BIT |
| | ECC FRAME ID | 1 BIT |
| | LOGICAL FRAME NUMBER | 6 BITS |
| PARTITION ID | | 16 BITS |
| AREA ID | | 4 BITS |
| DATA ID | | 4 BITS |
| N-POSITION | | 4 BITS |
| N-REPEATS | | 4 BITS |
| GROUP COUNT | | 24 BITS |
| FILE MARK COUNT | | 32 BITS |
| SAVE-SET MARK COUNT | | 32 BITS |
| RECORD COUNT | | 32 BITS |
| ABSOLUTE FRAME COUNT | | 24 BITS |
| RESERVED | | |

FIG. 11

AREA ID DEFINITIONS

| BIT 3210 | DEFINITION |
|---|---|
| 0000 (0) | DEVICE AREA |
| 0001 (1) | REFERENCE AREA |
| 0010 (2) | SYSTEM AREA |
| 0011 (3) | RESERVED |
| 0100 (4) | DATA AREA |
| 0101 (5) | EOD AREA |
| 0110 (6) | RESERVED |
| 0111 (7) | OPTIONAL DEVICE AREA |

FIG. 13

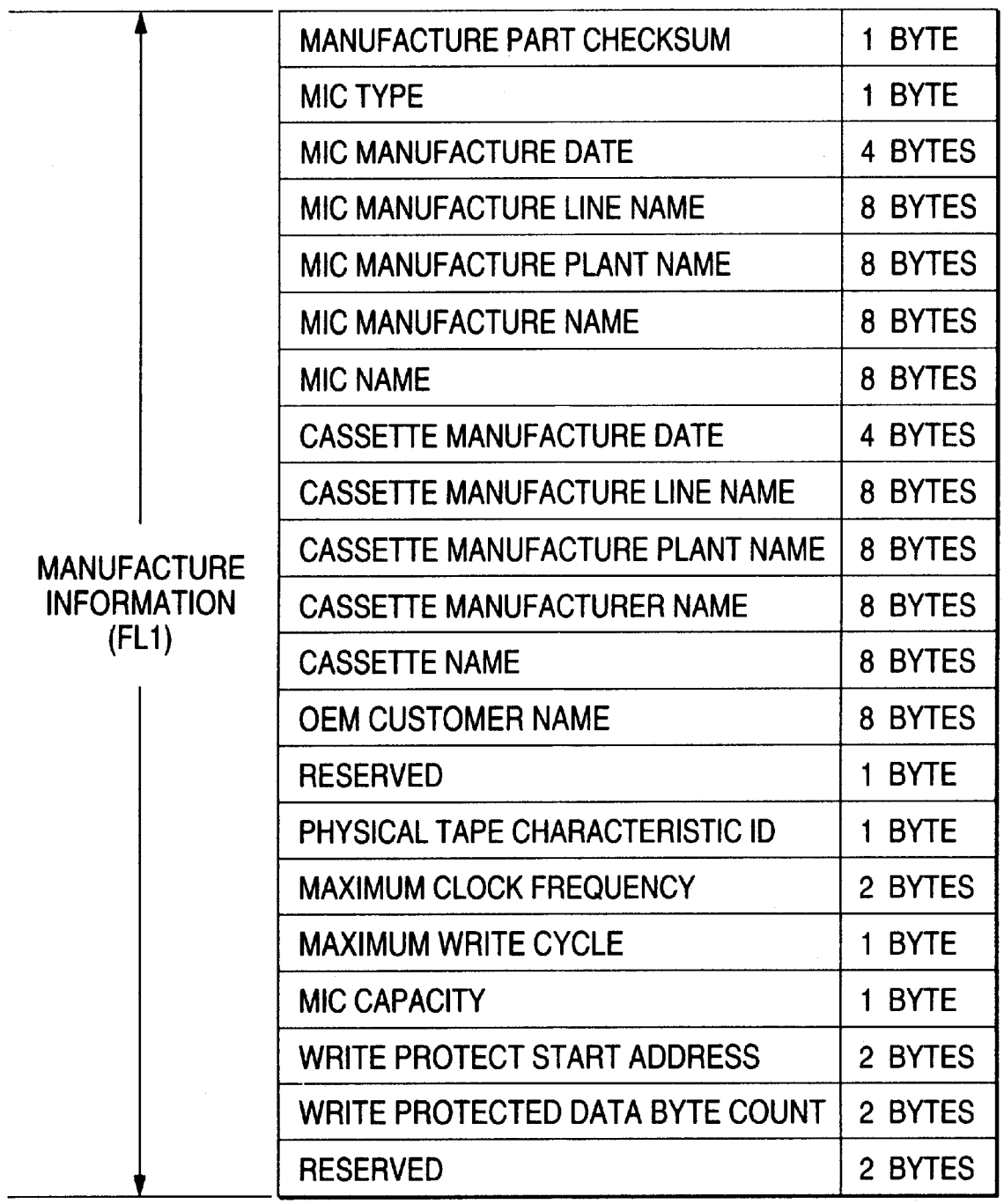

| MANUFACTURE INFORMATION (FL1) | | |
|---|---|---|
| | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES |
| | MAXIMUM WRITE CYCLE | 1 BYTE |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

FIG. 15

| | |
|---|---|
| VOLUME INFORMATION CHECKSUM | 1 BYTE |
| VOLUME INFORMATION | 100 BYTES |
| ACCUMULATIVE PARTITION INFORMATION CHECKSUM | 1 BYTE |
| ACCUMULATIVE PARTITION INFORMATION | 56 BYTES |
| VOLUME NOTE CHECKSUM | 1 BYTE |
| VOLUME NOTE | 8 BYTES |
| CARTRIDGE SERIAL NUMBER | 32 BYTES |
| MANUFACTURER ID | 1 BYTE |
| SECONDARY ID | 1 BYTE |
| CARTRIDGE SERIAL NUMBER PART CHECKSUM | 1 BYTE |
| RESERVED | 1 BYTE |
| SPECIFIC VOLUME TAG 1 | 36 BYTES |
| SPECIFIC VOLUME TAG 2 | 36 BYTES |
| SPECIFIC VOLUME TAG 3 | 36 BYTES |
| SPECIFIC VOLUME TAG 4 | 36 BYTES |
| SPECIFIC VOLUME TAG 5 | 36 BYTES |
| SPECIFIC VOLUME TAG 6 | 36 BYTES |
| SPECIFIC VOLUME TAG 7 | 36 BYTES |
| SPECIFIC VOLUME TAG 8 | 36 BYTES |
| SPECIFIC VOLUME TAG 9 | 36 BYTES |
| SPECIFIC VOLUME TAG 10 | 36 BYTES |
| SPECIFIC VOLUME TAG 11 | 36 BYTES |
| SPECIFIC VOLUME TAG 12 | 36 BYTES |
| SPECIFIC VOLUME TAG 13 | 36 BYTES |

VOLUME TAG (FL3)

FIG. 17A

VOLUME INFORMATION (FL3)

| VOLUME INFORMATION CHECKSUM | 1 BYTE |
|---|---|
| EJECT STATUS | 20 BYTES |
| REEL DIAMETER | 4 BYTES |
| RESERVED | 1 BYTE |
| INITIALIZE COUNT | 3 BYTES |
| VOLUME INFORMATION ON TAPE | 72 BYTES |

FIG. 17B

VOLUME INFORMATION ON TAPE

| | | |
|---|---|---|
| RESERVED | 4 BYTES | ↑ |
| RESERVED | 2 BYTES | |
| RESERVED | 3 BITS | |
| SUPER HIGH SPEED SEARCH ENABLE FLAG | 1 BIT | |
| SYSTEM LOG ALLOCATION FLAGS | 2 BITS | |
| ALWAYS UNLOAD PBOT FLAG | 1 BIT | 72 BYTES |
| AIT NATIVE FLAG | 1 BIT | |
| LAST VALID PARTITION NUMBER | 1 BYTE | |
| OPTIONAL DEVICE AREA ALLOCATION MAP (ARRAY [ 0 ··· 255 ] OF BIT) | 32 BYTES | |
| RESERVED | 32 BYTES | ↓ |

FIG. 18A

| EJECT STATUS | RESERVED | 1 BYTE |
| | ABSOLUTE FRAME COUNT | 3 BYTES |
| | PARTITION ID | 1 BYTE |
| | GROUP COUNT | 3 BYTES |
| | RECORD COUNT | 4 BYTES |
| | SAVE SET MARK COUNT | 4 BYTES |
| | FILE MARK COUNT | 4 BYTES |

20 BYTES

FIG. 18B

| REEL DIAMETER | SUPPLY REEL INTEGER PART | 1 BYTE |
| | SUPPLY REEL FRACTION PART | 1 BYTE |
| | TAKE UP REEL INTEGER PART | 1 BYTE |
| | TAKE UP REEL FRACTION PART | 1 BYTE |

4 BYTES

TAPE DRIVING APPARATUS AND RECORDING MEDIUM

BACKGROUND OF THE INVENTION

1. Field of the Invention

The present invention relates to a recording medium and a tape driving-apparatus accommodating thereto.

2. Description of the Related Art

A so-called tape streaming drive has been known as a driving apparatus which is capable of recording/reproducing digital data to/from a magnetic tape. Although it depends on the length of a tape of the tape cassette, i.e., a medium, the tape streaming drive is capable of having an enormous amount of recording capacity of several tens to several hundreds giga bytes for example. Therefore, it is widely used for backing up data recorded in a medium such as a hard disk of a computer main body for example. It is also considered to be suitable for use in storing image data whose data size is large.

Then, as the tape streaming drive as described above, there has been proposed one which is arranged so as to record/reproduce data by using a tape cassette of an 8 mm VTR as a recording medium and by adopting a helical scan scheme by means of a rotary head for example.

The tape streaming drive utilizing the 8 mm VTR tape cassette as described above uses SCSI (Small Computer System Interface) for example, as an input/output interface for recording/reproducing data.

Then, data supplied from a host computer for example is inputted via the SCSI interface during recording and the inputted data is compressed and encoded in the predetermined manner to be recorded in the magnetic tape of the tape cassette.

During the reproduction, data in the magnetic tape is read and decoded as necessary to be transmitted to the host computer via the SCSI interface.

By the way, a data storage system composed of the tape streaming drive and the tape cassette as described above requires various positional information on the magnetic tape and information regarding to the history of use of the magnetic tape as management information utilized by the tape streaming drive in managing the recording/reproducing operation and the like for example, to adequately implement the recording/reproducing operation on the magnetic tape of the tape cassette.

Then, it is conceivable to provide an area for such management information at the head of the magnetic tape.

Thus, the tape streaming drive accesses to the area of the management information described above to read the required management information before executing the data recording or reproducing operation to/from the magnetic tape, and based on this management information, executes various processing operations so that the recording/reproducing operation thereafter is adequately carried out.

After ending the data recording/reproducing operation, the tape streaming drive accesses to the area of the management information again to rewrite the contents of management information which has become necessary to be changed due to the recording/reproducing operation and is ready for the next recording/reproducing operation. After that, the tape streaming drive unloads or ejects the tape cassette.

However, when the tape streaming drive carries out the recording/reproducing operation based on the management information as described above, it must access to the area of the management information at the head of the magnetic tape in starting the operation in either cases of the recording and reproducing operation, and access to the area of this management information to write/read information also in ending the operation. That is, it is unable to load or unload the tape cassette on the way of the magnetic tape in ending to record/reproduce data.

In case of the tape streaming drive, it takes a considerable time to access to the head of the magnetic tape or to the area of the management information at the head of a partition because the magnetic tape has to be fed physically to make the access. The magnetic tape has to be fed more and it take more time particularly in ending to record/reproduce data at the position physically separated from the area of the management information on the magnetic tape.

Thus, there has been a problem that it takes time in ejecting or replacing the tape cassette in the case of the tape streaming drive.

SUMMARY OF THE INVENTION

In view of the problem described above, it is an object of the invention to enable to quickly eject or replace a recording medium and to improve the reliability of a system.

In order to achieve the above-mentioned object, an inventive recording medium comprises a magnetic tape and a memory for recording management information for managing a recording/reproducing operation to/from the magnetic tape.

The memory is also provided with areas for storing information on tape position in ejecting out of the tape driving apparatus. The tape positional information is information on reel diameters within the tape cassette in which the magnetic tape is wound around reels.

When a plurality of partitions may be set on the magnetic tape, the memory is provided with areas for storing information for discriminating a partition in ejecting out of the tape driving apparatus.

The inventive tape driving apparatus comprises tape driving means for running the magnetic tape of the loaded tape cassette and for recording/reproducing information to/from the magnetic tape which is being run; memory driving means for reading/writing management information from/to the memory of the loaded tape cassette; tape position detecting means for detecting the information on the position of the magnetic tape which is being run by the tape driving means; and control means for causing the memory driving means to store the tape positional information in ejecting the tape cassette in the memory within the tape cassette.

When the magnetic tape has a plurality of partitions, the control means causes the memory driving means to store information for discriminating a partition in ejecting the tape cassette to the memory within the tape cassette.

The the control means of the inventive tape driving apparatus also causes the memory driving means to read the tape positional information at the previous ejection when the tape cassette is loaded, causes tape position detecting means to detect the tape positional information, compares these tape positional information and enables to record/reproduce data to/from the magnetic tape when the result of comparison is adequate.

When a plurality of partitions are set on the magnetic tape, the control means causes the memory driving means to read information for discriminating a partition at the previous ejection from the memory when the tape cassette is loaded, causes the tape driving means to read partition discriminating information on the magnetic tape, compares these partition discriminating information and enables to record/reproduce data to/from the magnetic tape when the both results of comparison of the partition discriminating information and of the tape positional information are adequate.

When the result of comparison is not adequate, the control means causes the tape driving means to run the magnetic tape forcibly to the starting end position.

That is, the memory, e.g., an nonvolatile memory, is provided within a case of the tape cassette to cause it to store the management information. It then enables to eliminate the need for rewinding the magnetic tape to the tape top for example, in loading/unloading the tape. It also allows a large number of partitions to be set on the tape to allow the tape to be adequately managed.

Still more, it is possible to realize the adequate recording/reproducing operation after loading by discriminating, in loading the tape, whether or not the tape is loaded correctly at the previous unload position in correspondence to the operation in which the tape may be loaded/unloaded on the way.

To that end, the tape positional information and partition discriminating information are stored in the memory at each time in ejecting (unloading) the tape cassette. Then, when the recording medium is charged and the magnetic tape is loaded, the tape positional information detected at that time is compared with the tape positional information stored in the memory. In some cases, it is confirmed whether or not the recording medium is loaded correctly by comparing the partition discriminating information read from the magnetic tape with the partition discriminating information stored in the memory.

The specific nature of the invention, as well as other objects, uses and advantages thereof, will clearly appear from the following description and from the accompanying drawings in which like numerals refer to like parts.

BRIEF DESCRIPTION OF THE DRAWINGS

FIGS. 5A through 5D are explanatory diagrams showing the structure of data on a magnetic tape in the tape cassette of the embodiment;

FIG. 10 is a table for explaining ID area information of the tape cassette of the embodiment;

FIG. 11 is a table for explaining the definition of Area IDs of the tape cassette of the embodiment;

FIG. 13 is a table for explaining manufacture information of the MIC of the embodiment;

FIG. 15 is a table for explaining Volume Tags of the MIC of the embodiment;

FIGS. 17A and 17B are tables for explaining volume information of the MIC of the embodiment;

FIGS. 18A and 18B are tables for explaining Eject Status and Reel Diameter information in the Volume Information of the MIC of the embodiment;

DESCRIPTION OF THE PREFERRED EMBODIMENTS

An embodiment of the present invention will be explained below.

The present embodiment pertains to a tape cassette provided with an nonvolatile memory and a tape driving apparatus (tape streaming drive) which is capable of recording/reproducing digital data in correspondence to the memory-fitted tape cassette.

It is noted that the nonvolatile memory provided in the tape cassette will be referred to as a MIC (Memory In Cassette) hereinafter.

The explanation will be given below in the following order:

1. Structure of Tape Cassette;
2. Tape Loading Mechanism;
3. Structure of Tape Streaming Drive;
4. Structure of Data on Magnetic Tape;
5. ID Area;
6. Data Structure of MIC;
7. Position Detecting Method;
8. Unloading Operation;
9. Loading Operation.

1. Structure of Tape Cassette

At first, the tape cassette fitted with the MIC accommodating to the tape streaming drive 10 of the present embodiment described later will be explained with reference to FIGS. 1 and 2.

Figure 1:
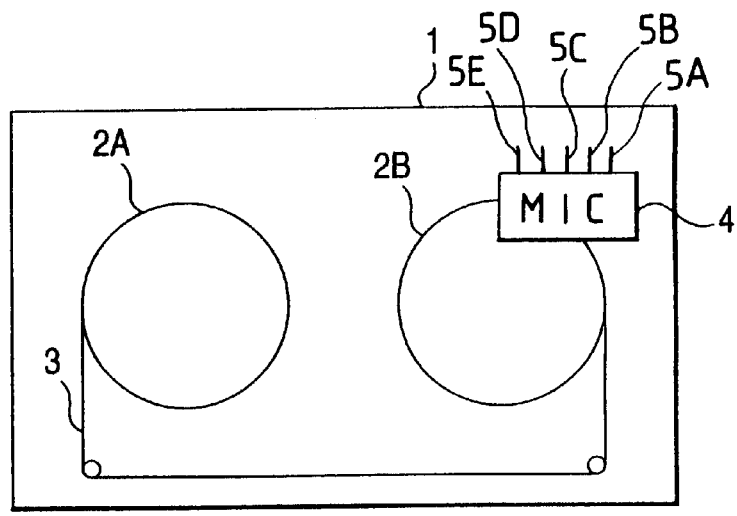
FIG. 1 is an explanatory diagram schematically showing the internal structure of a tape streaming drive according to one embodiment of the invention.

FIG. 1 conceptually shows the internal structure of the tape cassette, wherein reel hubs 2A and 2B are provided within the tape cassette 1 and a magnetic tape 3 of 8 mm in tape width is wound between the both reel hubs 2A and 2B.

The tape cassette 1 is provided with a MIC 4, i.e., the nonvolatile memory. From the module of the MIC 4, five terminals 5A, 5B, 5C, 5D and 5E are led out as a power terminal, a data input terminal, a clock input terminal, an earth terminal and a spare terminal, respectively. Although the detail will be described later, the MIC 4 stores information regarding to the manufacturing date and site of each tape cassette, thickness, length and material of the tape, the history of usage of the recorded data per each partition, user information and the like. It is noted that the various information stored in the MIC 4 will be referred to also as "management information" in the present specification.

Figure 2:
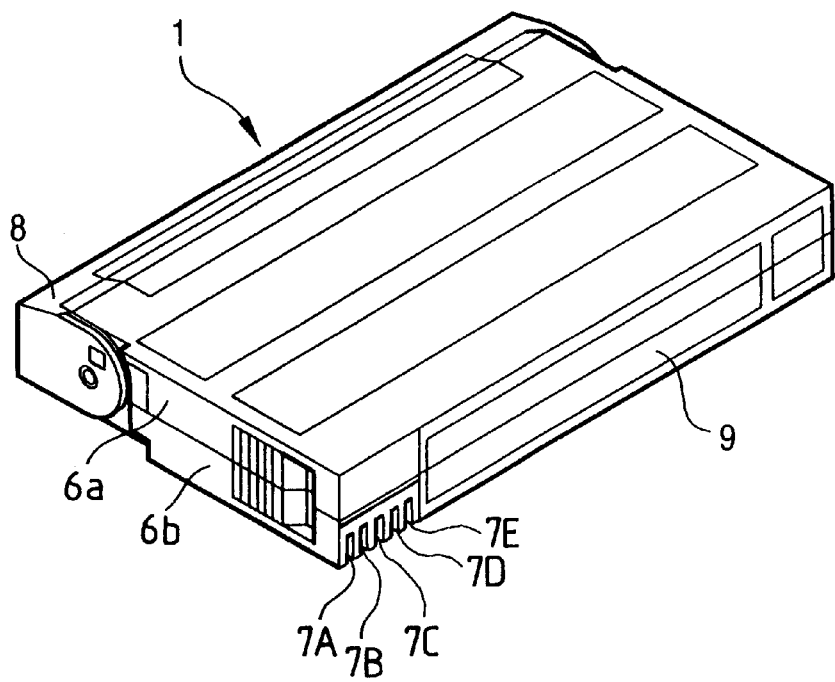
FIG. 2 is a perspective view showing the appearance of a tape cassette of the embodiment.

FIG. 2 shows the appearance of the tape cassette 1. The whole case is composed of an upper case 6a, a lower case 6b and a lid member 8 and is basically same in its structure as a tape cassette used for the normal 8 mm VTRs. The tape cassette 1 is provided with terminal pins 7A, 7B, 7C, 7D and 7E on a labeling plane 9 on the side of the tape cassette 1 to be connected respectively with the terminals 5A, 5B, 5C, 5D and 5E explained above in connection with FIG. 1. That is, the tape cassette 1 physically contacts with the tape streaming drive 10 described next via the terminal pins 7A, 7B, 7C, 7D and 7E to mutually transmit data signals and the like.

2. Tape Loading Mechanism

Next, a tape loading mechanism with respect to the tape cassette 1 within the tape streaming drive 10 of the present embodiment will be explained.

Figure 3:
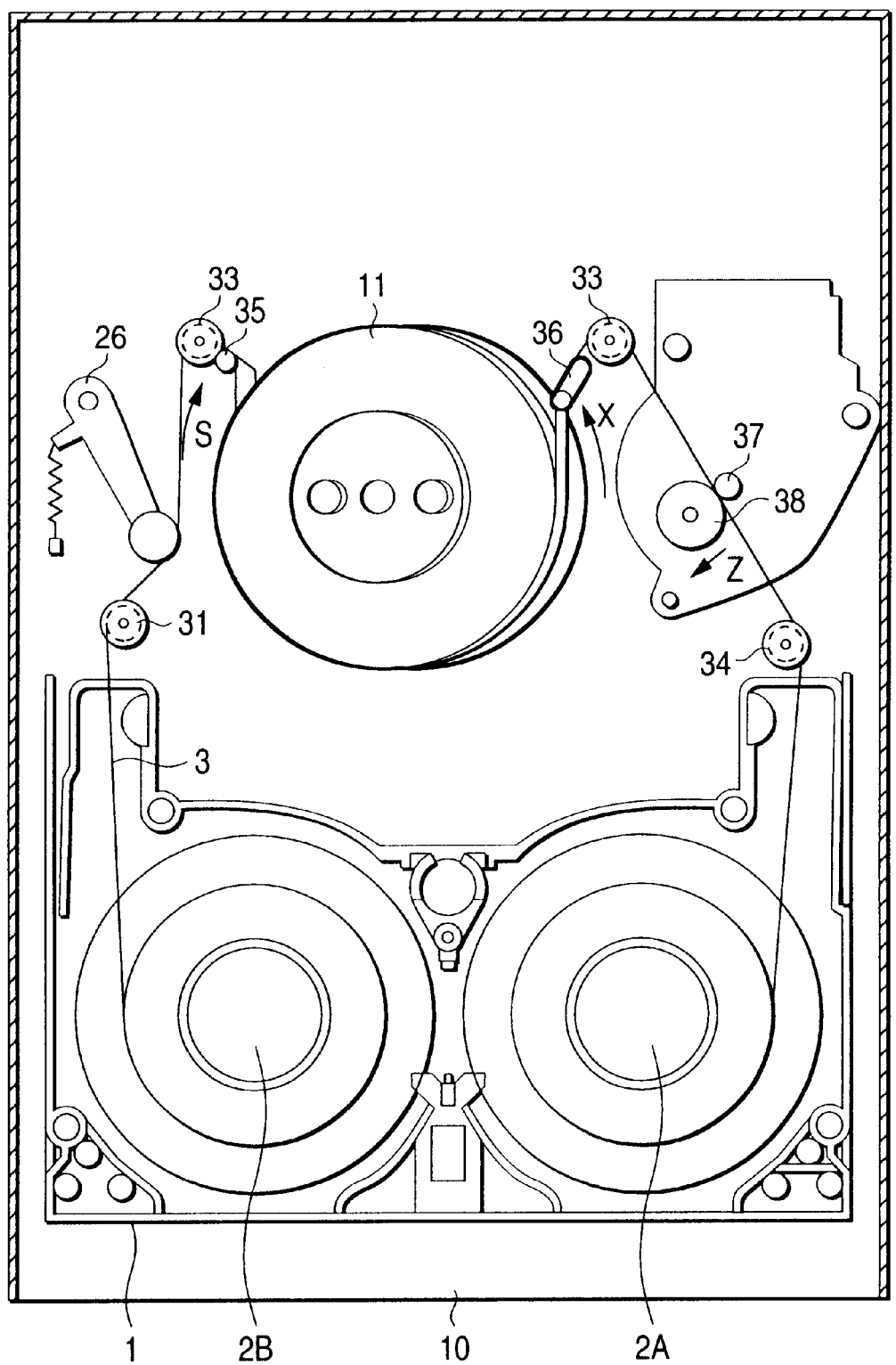
FIG. 3 is an explanatory diagram showing a loading mechanism of the tape streaming drive of the embodiment.

FIG. 3 shows a state in which the tape cassette 1 is charged and loaded within the tape streaming drive 10 of the embodiment.

When the tape cassette 1 is inserted within the tape streaming drive 10, it is seated on a tape driving mecha-deck section shown in FIG. 3 by a charging mechanism not shown and the magnetic tape 3 is pulled out of the tape cassette 1 to be loaded. When the tape cassette 1 is to be ejected, the loaded tape is wound up into the tape cassette 1 and the charging mechanism discharges the tape cassette 1.

It is noted that the detailed explanation of the structure and operation of the mecha-deck section is described in the prior application (U.S. Pat. No. 5,712,744) which the present applicant has applied before and therefore, it will be explained just briefly here.

Figure 4:
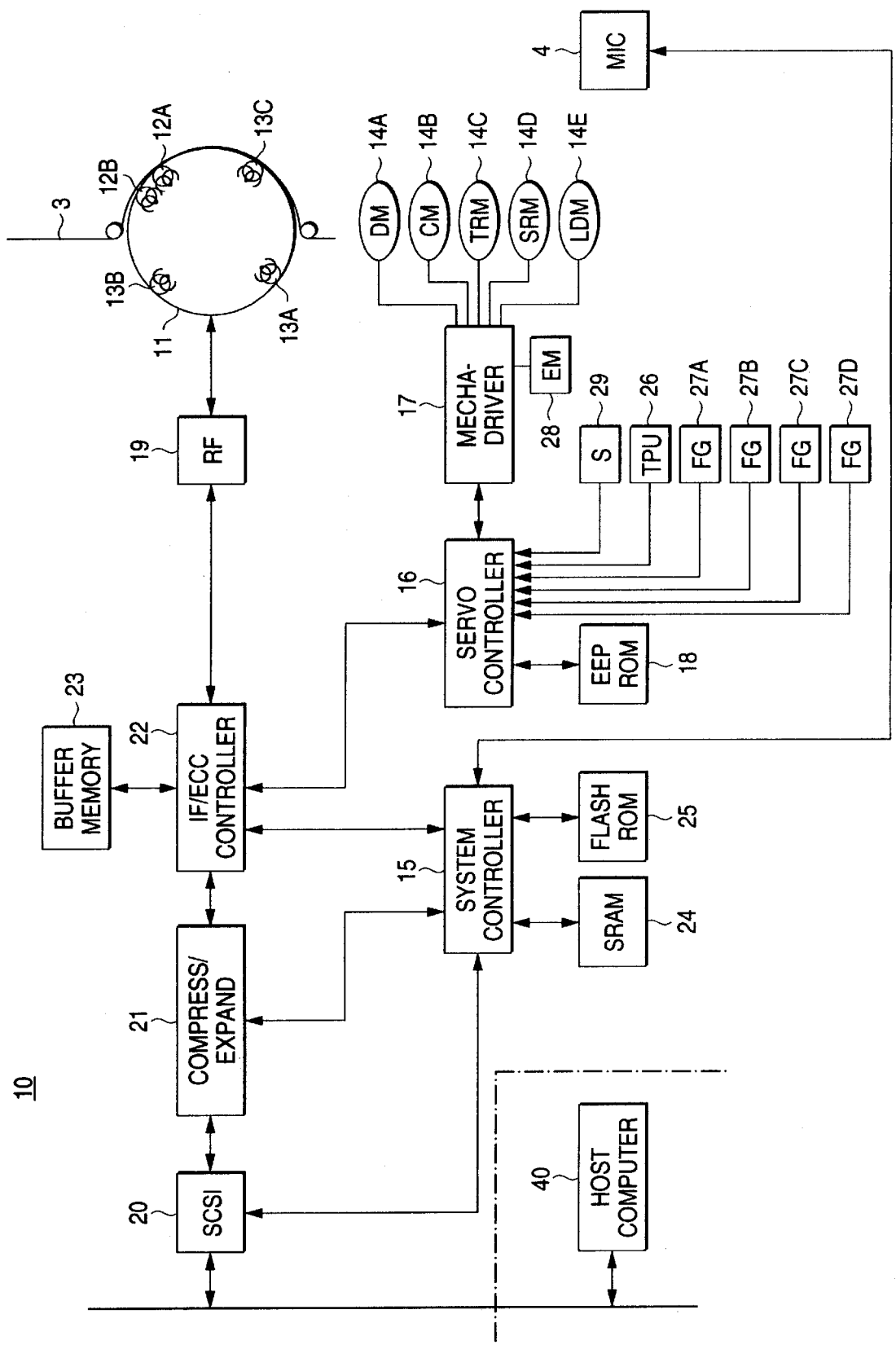
FIG. 4 is a block diagram of the tape streaming drive according to the embodiment of the invention.

The tape cassette 1 seated in the mecha-deck section as shown in FIG. 3 is engaged so that the reel hubs 2A and 2B are driven in the normal and reverse directions, respectively, by a reel motor described later in FIG. 4. The magnetic tape 3 is pulled out of the tape cassette 1 thus seated and is wound around a rotary drum 11 at a predetermined angle.

That is, the lid member 8 shown in FIG. 2 of the seated tape cassette 1 is opened and the magnetic tape 3 is led out of the case of the tape cassette 1 as movable loading pins 35 and 36 move in the S and X directions in the figure. Then, a tape path is defined by guide rollers 31, 32, 33 and 34 and the magnetic tape 3 is wound around the rotary drum 11.

A pinch roller 38 gives certain tension to the magnetic tape 3 on the tape path between the guide rollers 33 and 34, and presses the magnetic tape 3 to the outer peripheral face of a capstan 37. Thereby, the magnetic tape 3 is run at constant velocity as the capstan 37 is rotated at the constant velocity.

Thus, the operation for recording/reproducing data to/from the magnetic tape 3 is carried out by running the magnetic tape 3 and rotating the rotary drum 11 on which a magnetic head is disposed.

The pinch roller 38 is moved to the predetermined position in the direction of arrow Z and thereby the magnetic tape 3 is released from the pinch roller 38 and the capstan 37 in running at high speed such as Quick-Feed and Rewind.

It is noted that the state in which the pinch roller 38 is pressed to the capstan 37 side will be called as pinch-on and the state in which it is separated from the capstan 37 will be called as pinch-off.

A back-tension is applied while running the tape so that the tape does not slack. This back-tension is obtained by controlling the drive and rotation of the reel hubs 2A and 2B.

Here, a tension pickup 26 is disposed between the guide rollers 31 and 32. The state of turn of the tension pickup 26 fluctuates corresponding to the tension given to the magnetic tape 3 as it press-contacts with the magnetic tape 3 while being urged by a spring. Accordingly, it is possible to obtain a detection signal corresponding to the tension applied to the magnetic tape 3 by electrically detecting the status of the turn (turn position) of the tension pickup 26 by a Hall element for example.

3. Structure of Tape Streaming Drive

Next, the structure of the tape streaming drive 10 of the present embodiment will be explained with reference to FIG. 4. The tape streaming drive 10 records/reproduces data to/from the magnetic tape 3 in the tape cassette 1 which is seated and whose tape is loaded as shown in FIG. 3, in a helical scan scheme.

The rotary drum 11 is provided with two recording heads 12A and 12B and three reproducing heads 13A, 13B and 13C for example.

The recording heads 12A and 12B are disposed so that two gaps having different azimuth angles are very close to each other. The reproducing heads 13A, 13B and 13C also have respective predetermined azimuth angles.

A drum motor 14A rotates the rotary drum 11 around which the magnetic tape 3 pulled out of the tape cassette 1 as described above is wound.

A capstan motor 14B rotates and drives the capstan 37 for running the magnetic tape 3 at constant speed.

A T-reel motor 14C and an S-reel motor 14D rotate the T-reel hub 2A and the S-reel hub 2B in the normal and inverse directions, respectively.

A loading motor 14E moves the respective positions of the loading pins 35 and 36 and a required guide roller to load/unload the magnetic tape 3 to/from the rotary drum 11.

An eject motor 28 drives the mechanism for charging the tape cassette 1 and runs the seating and discharging operations of the inserted tape cassette 1.

A mecha-driver 17 applies power and drives the drum motor 14A, the capstan motor 14B, the T-reel motor 14C, the S-reel motor 14D, the loading motor 14E and the ejecting motor 28. The mecha-driver 17 drives the respective motors based on controls made by a servo controller 16. The servo controller 16 controls the rotating speed of the respective motors to execute the running of the tape in recording/reproducing data normally, in quickly reproducing data and in quickly feeding and rewinding the tape, the tape cassette charging operation, the loading/unloading operation, the tape tension controlling operation and others.

An EEPROM 18 stores contents and others used by the servo controller 16 in servo-controlling the respective motors.

The drum motor 14A, the capstan motor 14B, the reel motors 14C and 14D are provided with FGs (frequency generator), respectively, to be able to detect information on the rotation of the respective motors, in order to enable the servo controller 16 to execute the servo control of the respective motors. That is, there are provided a drum FG 27A for generating frequency pulses synchronized with the rotation of the drum motor 14A, a capstan FG 27B for generating frequency pulses synchronized with the rotation of the capstan motor 14B, a T-reel FG 27C for generating frequency pulses synchronized with the rotation of the T-reel motor 14C and an S-reel FG 27D for generating frequency pulses synchronized with the rotation of the S-reel motor 14D. Their outputs (FG pulses) are supplied to the servo controller 16.

The capstan FG 27B outputs pulses of 360 waves per turn of the capstan motor 14B for example.

The T-reel, FG 27C and the S-reel FG 27D output pulses of 24 waves per turn of the T-reel motor 14C and the S-reel motor 14D, respectively.

Discriminating the rotating speed of the respective motors based on those FG pulses, the servo controller 16 detects an error with intended rotating speed about the rotating operation of each motor and controls the mecha-driver 17 about the applied power corresponding to that error, thus realizing the control of the rotating speed by the closed loop. Accordingly, the servo controller 16 can control so that the respective motors rotate at target rotating speeds corresponding to the respective operations during the various operations such as,the normal run in recording/reproducing data, quick search, quick-feed, rewind and others.

Tension detected information as the position of turn of the tension pickup 26 formed as described above is also supplied to the servo controller 16.

The servo controller 16 can control the tension so that intended back-tension is always applied to the running tape 3 by correcting the rotating speed of the T-reel motor 14C and the S-reel motor 14D corresponding to the tension detected information.

A sensor 29 is a switch sensor for detecting the charging (seating) state of the tape cassette 1. The status of charge of the tape cassette 1 may be detected as an output of the sensor 29 is supplied to the servo controller 16.

The servo controller 16 is bi-directionally connected with a system controller 15 for executing control processes of the whole system via an interface controller/ECC formatter 22 (hereinafter referred to as an IF/ECC controller).

In the tape streaming drive 10, an SCSI interface 20 is used for inputting/outputting data. For instance, data is inputted sequentially from a host computer 40 via the SCSI interface 20 in unit of transmission data of fixed length record and is supplied to the compressing/expanding circuit 21 in recording data. It is noted that there exists a mode of transmitting data from the host computer 40 in unit of sets of variable length data in such tape streaming drive system.

The compressing/expanding circuit 21 implements a process for compressing the inputted data in a predetermined method as necessary. When a compressing method by means of LZ codes is adopted, for example, as one example of the compressing methods, dedicated codes are allocated to character strings processed in the past and are stored in a shape of a dictionary. Then, a character string inputted thereafter is compared with the contents of the dictionary. When it coincides with the code in the dictionary, the data of the character string is replaced with the code in the dictionary. When the data of the inputted character string does not coincide with the code in the dictionary, a new code is given thereto and is registered in the dictionary one after another. Thus, the data compression is carried out by registering data of inputted character strings in the dictionary and by replacing the character string data with the codes of the dictionary.

While the output of the compressing/expanding circuit 21 is supplied to the IF/ECC controller 22, the IF/ECC controller 22 stores the output of the compressing/expanding circuit 21 once in a buffer memory 23 by its control operation. The data stored in the buffer memory 23 is processed to be handled finally in unit of fixed. length corresponding to 40 tracks of the magnetic tape of Group and is processed into an ECC format under the control of the IF/ECC controller 22.

As the ECC formatting process, an error correcting code is added to the recorded data and the data is modulated so as to fit with the magnetic recording. The data is then supplied to an RF processing section 19.

The RF processing section 19 implements processes such as amplification and record equalizing to the recorded data to generate a recording signal to be supplied to the recording heads 12A and 12B. Thereby, the data is recorded to the magnetic tape 3 from the recording heads 12A and 12B.

The data reproducing operation will be explained briefly. The reproducing heads 13A and 13B read the data recorded in the magnetic tape 3 as RF reproducing signals and the RF processing section 19 implements reproduction equalizing, generation of reproducing clocks, binarization, decoding (e.g., Viterbi decoding) and others on the reproduced output.

The signal thus read is supplied to the IF/ECC controller 22 to undergo an error correcting process and others at first. It is then stored temporarily in the buffer memory 23 and is read at the predetermined point of time to be supplied to the compressing/expanding circuit 21.

Based on the judgment of the system controller 15, the compressing/expanding circuit 21 implements a data expanding process when the data is what has been compressed by the compressing/expanding circuit 21 during recording, or outputs as it is without implementing the data expanding process when the data is non-compressed data.

The output data of the compressing/expanding circuit 21 is outputted to the host computer 40 as reproduced data via the SCSI interface 20.

The figure also shows the MIC 4 together with the magnetic tape 3 of the tape cassette 1. When the main body of the tape cassette is charged to the tape streaming drive, the MIC 4 is connected so as to be able to input/output data to/from the system controller 15 via the terminal pins 7A through 7E shown in FIG. 3. Thereby, the system controller 15 can read or update the management information recorded in the MIC 4.

Information is transmitted mutually between the MIC 4 and the external host computer 40 by using SCSI commands. Therefore, it is not necessary to provide a dedicated line specifically between the MIC 4 and the host computer 40 and data can be exchanged between the tape cassette and the host computer 40 just by connecting the SCSI interface as a result.

An S-RAM 24 and a flash ROM 25 store data used by the system controller 15 for the various processes.

For instance, the flash ROM 25 stores constants and others used for the control. The S-RAM 24 is used as a work memory, as a memory for storing data read/written from/to the MIC 4, mode data set in unit of tape cassette and various flag data or as a memory for operating processes.

It is noted that the S-RAM 24 and the flash ROM 25 may be constructed as an internal memory of a microcomputer composing the system controller 15 or part of an area of the buffer memory 23 may be used as a work memory 24.

While information is transmitted mutually between the tape streaming drive 10 and the host computer 40 by using the SCSI interface 20 as described above, the host computer 40 makes various communications with the system controller 15 by using the SCSI commands.

4. Structure of Data on Magnetic Tape

Next, a format of data on the magnetic tape 3 in the tape cassette 1 which is recorded/reproduced by the tape streaming drive 10 described above will be explained.

FIGS. 5A through 5B show the structure of data recorded in the magnetic tape 3, wherein FIG. 5A schematically shows one magnetic tape 3.

According to the present embodiment, one magnetic tape 3 is arranged such that it can be used by dividing in unit of partition as shown in FIG. 5 and in case of the present system, so that 256 partitions may be set and controlled in maximum. Each partition shown in the figure is managed by Partition No. as described as Partition #0, #1, #2, #3, . . .

Accordingly, it is possible to record/reproduce data independently per partition in the present embodiment. For instance, the recording unit of data within one partition shown in FIG. 5B may be divided into a unit of fixed length called Group as shown in FIG. 5C and the data is recorded to the magnetic tape 3 in the unit of this group.

In this case, one group corresponds to a data amount of 20 Frames and one frame is composed of two Tracks as shown in FIG. 5D. The two tracks composing one Frame are plus azimuth and minus azimuth tracks adjacent to each other. Accordingly, one group is composed of 40 tracks.

Figure 6A:
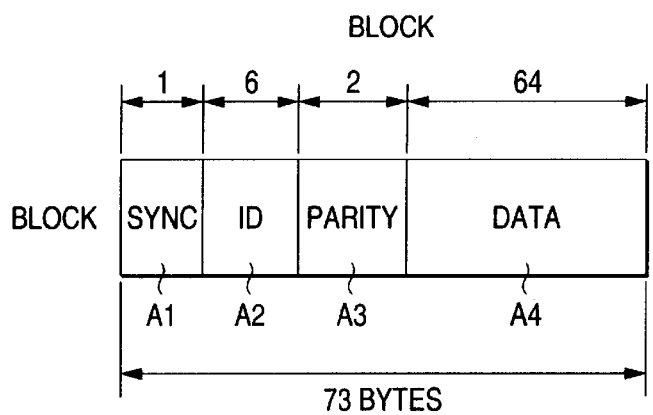
FIGS. 6A through 6C are explanatory diagrams showing the structure of a track on the magnetic tape in the tape cassette of the embodiment.
Figure 6B:
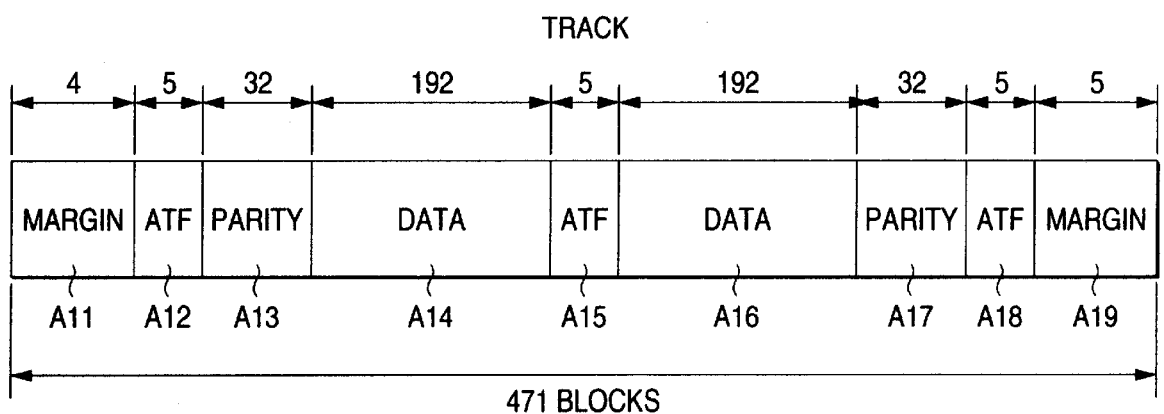

FIGS. 6A and 6B show the structure of data of one track shown in FIG. 5D.

FIG. 6A shows the data structure in unit of Block. One block is composed of an ID Area A2 of 6 bytes used for search and the like following to a SYNC Data Area A1 of 1 byte, an Error Correcting Parity Area A3 composed of 2 bytes for ID data and a Data Area A4 of 64 bytes.

Then, data of one track shown in FIG. 6B is composed of 471 blocks in total. One track is provided with Margin Areas A11 and A19 of four blocks at the both ends as shown in the figure and with tracking control ATF Areas A12 and A18 after the Margin Area A11 and before the Margin Area A19. Further, it is provided with Parity Areas A12 and A17 after the AFT Area A12 and the before the ATF Area A18. An area of 32 blocks are provided for the Parity Areas A13 and A17.

It is also provided with an ATF Area 15 at the middle of one track and an area of five blocks is provided for the ATF Areas A12, A15 and A18. Then, Data Areas A14 and A16 of 192 blocks are provided between the ATF Area A15 and the Parity Area A17, respectively. Accordingly, the whole Data Area (A14 and A16) within one track occupies 192×2=384 blocks among 471 blocks in total.

Figure 6C:
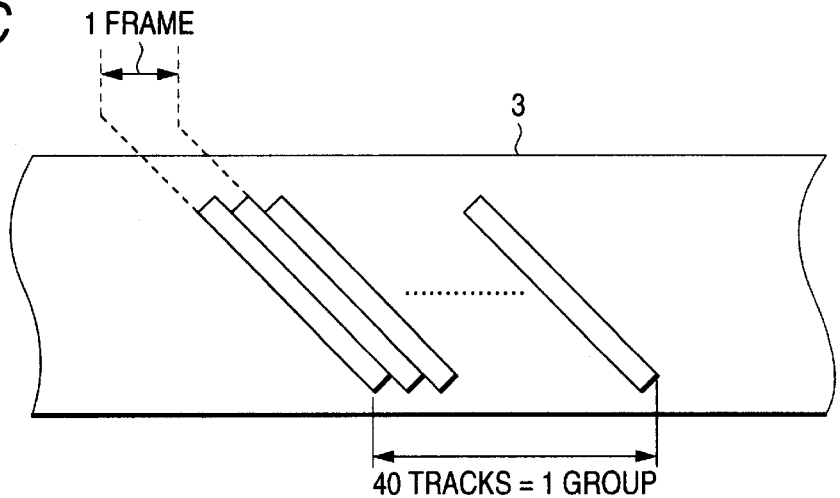

Then, the track is recorded physically on the magnetic tape 3 as shown in FIG. 6C and 40 tracks (=20 frames) compose one group as described before.

Figure 7A:
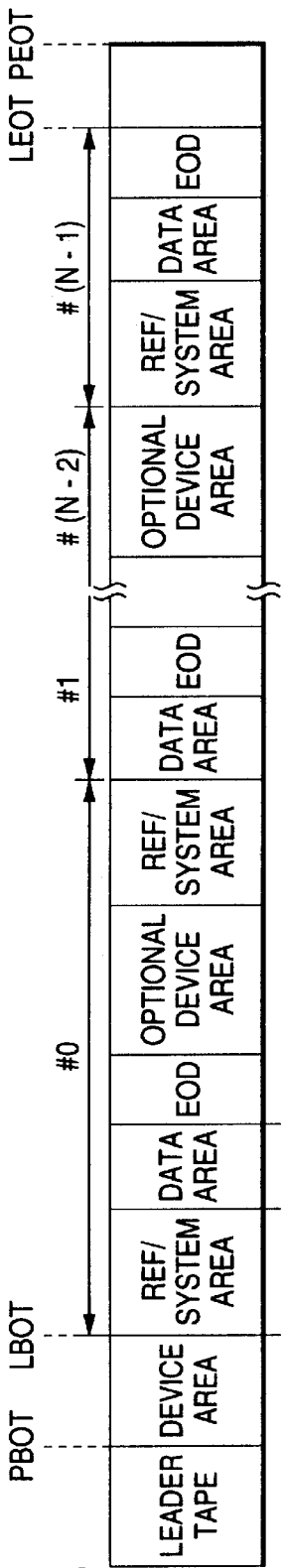
FIGS. 7A through 7C are explanatory diagrams showing the structure of an area on the magnetic tape in the tape cassette of the embodiment.
Figure 7B:
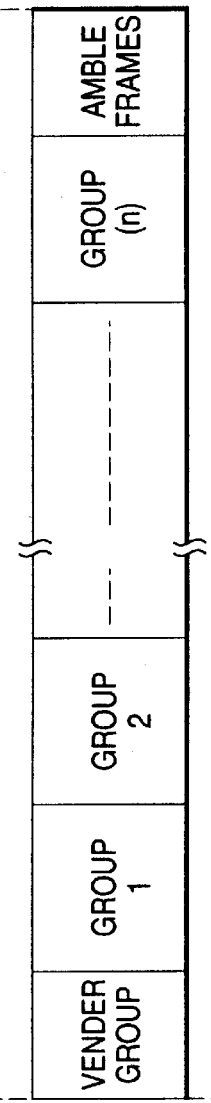
Figure 7C:
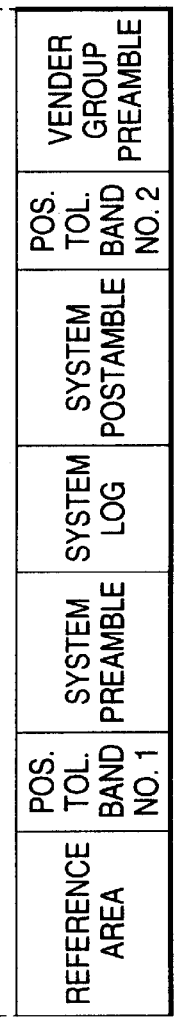

The data is recorded on the magnetic tape 3 explained in FIGS. 5 and 6 with the area structure shown in FIGS. 7A through 7C.

It is noted that a case in which N partitions from #0 to #N-1 are formed will be exemplified here.

Leader Tape is positioned physically at the head portion of the magnetic tape 3 as shown in FIG. 7A and Device Area which is an area for loading/unloading the tape cassette is provided next. The head of this Device Area is PBOT (Physical Beginning of Tape).

Following to the Device Area described above, there are provided Reference Area with regard to Partition #0 and System Area (this area including the reference area will be called as System Area hereinbelow) in which information on history of use of the tape for example is stored. Data Area is provided following to that.

The head of the System Area is LBOT (Logical Beginning of Tape).

Formed in this System Area are Reference Area, Position Tolerance Band NO. 1, System Preamble, System Log, System Postamble, Position Tolerance Band NO. 2 and Vendor Group Preamble as shown largely in FIG. 7C.

In the Dada Area following to the System Area, Vendor Group in which information on a vendor who creates and supplies the data at first is shown is provided and the groups shown in FIG. 5C, i.e., a plurality of Groups shown as Group 1, . . . Group (n) here, are formed continuously as shown largely in FIG. 7B. Then, Amble Frame is disposed after the final Group (n).

Following to such Data Area, an area of EOD (End of Data) indicating the end of the data area of the partition is provided as shown in FIG. 7A.

When only one partition is created, the end of the EOD of that Partition #0 is LEOT (Logical End of Tape). However, because the N partitions are created in this case, Optional Device Area is created following to the EOD of Partition #0.

While Device Area from the head position PBOT is the area for loading/unloading data corresponding to Partition #0, the Optional Device Area at the end of Partition #0 is an area for loading/unloading corresponding to Partition #1.

For Partition #1, areas are formed in the same manner as Partition #0 and Optional Device Area which is an area for loading/unloading corresponding to the next Partition #2 is formed at the end thereof.

Thereafter, partitions up to Partition #(N-1) are formed in the same manner.

It is noted that in the last Partition #(N-1), no Optional Device Area is formed because it is not necessary and the end of EOD of Partition #(N-1) is LEOT (Logical End of Tape).

PEOT (Physical End of Tape) indicates the physical end of the tape or the physical end of Partition.

It is noted that the present embodiment is arranged so as to eliminate the need for providing a management area at the top of a tape and for updating the management information by returning to the tape top in unloading data, i.e., so as to enable to unload/load even on the way of the magnetic tape, by providing the MIC 4 in the tape cassette 1 to store management information therein.

Then, the Device Area and the Optional Device Area are provided as described above as the positions for loading/unloading on the way of the tape.

5. ID Area

Next, the ID area A2 shown in FIG. 6A will be explained with reference to FIGS. 8 through 11.

Figures 8, 9:
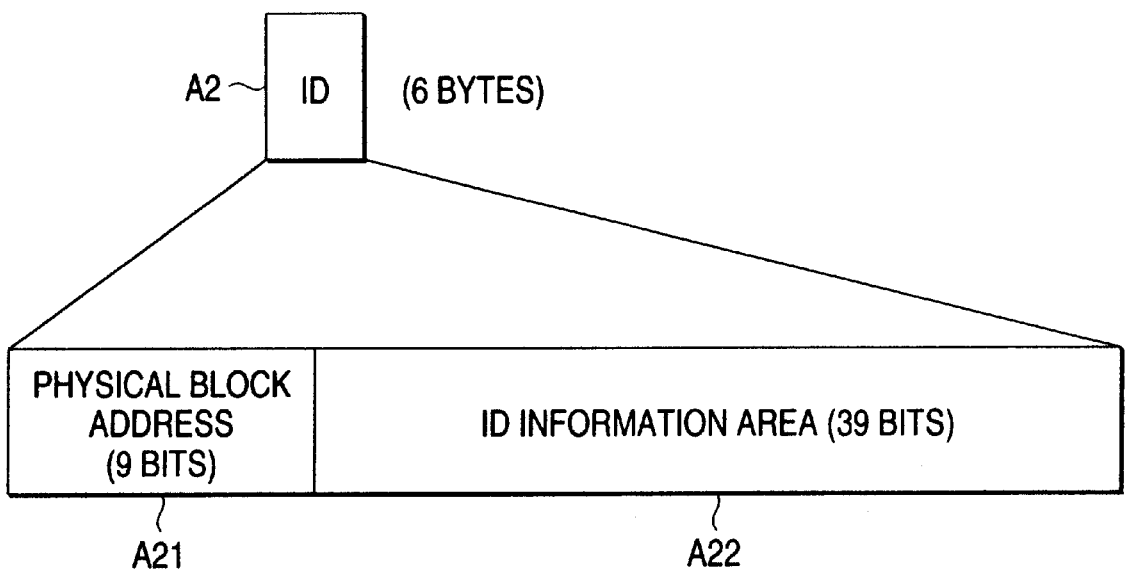
FIG. 8 is an explanatory diagram of an ID area on the magnetic tape in the tape cassette of the embodiment.
FIG. 9 is an explanatory diagram of a physical block address in the ID area of the tape cassette of the embodiment.

FIG. 8 shows the data structure of the ID Area A2. The ID Area A2 is composed of two areas of Physical Block Address A21 of 9 bits and ID information Area A22 of 9 bits.

Because the total data areas (A14 and A16) within one track is composed of 384 blocks as described before, a number of Physical Block Addresses included in these total data areas is also 384.

Then, address values are given to these 384 Physical Block Addresses 21 such that they increment from 0 to 383 in decimal notation in order from the Physical Block Address 21 located at the head of one track as diagrammatically shown in FIG. 9 for example.

Thereby, the recording/reproducing apparatus can adequately handle the information in the ID Information Area A22 contained in the data area within one track. Here, the data size of the ID Information Area A22 contained in the data area within one track is 1872 bytes as it may be found as follows:

39 (Bits)×384 (Blocks)=14,976 (Bits)=1,872 (Bytes)

FIG. 10 shows types of ID Area information stored in the ID Information Area A22 shown in FIG. 8. Each ID Area information shown in the figure is stored as it is allocated in accordance to a predetermined rule to the ID Information Areas A22, . . . of 1872 bytes in total contained in the data area of one track. The same type of ID Area information is recorded by a plurality of times in accordance to the predetermined rule per one track so that the tape streaming drive 10 can read the ID Area information reliably.

In FIG. 10, Raw Format ID (16 bits) indicates a type of fundamental format concerning to the magnetic tape. In case of the present embodiment, information such as a track pitch, a data size of one frame, a number of blocks contained in one track, a data size of one block, tape length, tape thickness and a material of the tape is shown. Logical Format ID (8 bits) indicates a type of a recording format actually used.

Logical Frame ID (8 bits) is composed of Last Frame ID (1 bit), ECC Frame ID (1 bit) and Logical Frame Number (6 bits) as shown in the figure. The Last Frame ID indicates whether or not the present frame containing the ID Area concerned is the last frame within the group and ECC Frame ID indicates whether or not recorded data in the data area of the present frame is ECC (Error Correcting Code).

While one group is composed of 20 frames as described before, Logical Frame Number indicates which No. the frame within the present group is.

Partition ID (16 bits) indicates Partition Number of the partition containing the present frame.

Area ID (4 bits) indicates to which area the frame concerned belongs. Data ID (4 bits) indicates a type of data processing mode based on the recording format. N-Position (4 bits) and N-Repeat (4 bits) define information concerning on data corresponding to a multiplex recording mode.

Group Count (24 bits) indicates a total number of groups upto a group in which the frame concerned is contained in the present partition. File Mark Count (32 bits) indicates a total number of file marks contained from the start position to the present group in the present partition. File Mark is information indicating a delimiter of a data file within one partition.

Save-Set Mark Count (32 bits) indicates a total number of file marks contained from the start position to the present group in the present partition. Save-Set Mark is information indicating a delimiter of data save position within one partition.

Record Count (32 bits) indicates a total number of records contained from the start position to the present group within the present partition. Absolute Frame Count (24 bits) indicates a total number of frames contained from the start position to the present group within the present partition. Reserved area is also provided to be ready for a case when ID area information is added in the future.

It is noted that the definition of the ID Area information and bit numbers given to the respective ID Area information shown in the figure are just one example and may be changed corresponding to the actual use conditions.

Area ID will be explained here among various ID Area information shown in FIG. 10.

FIG. 11 shows the contents of definitions of Area ID. In this case, bit numbers (3-2-1-0) are assigned to four bits forming the Area IDs, respectively. When each value of the bit numbers (3-2-1-0) is [0000] as shown in the figure, it is defined to be Device Area, [0001] to be Reference Area, [0010] to be System Area and [0011] to be Reserved.

Further, [0100] is defined to be Data Area, [0101] to be EOD Area, [0110] to be Unreserved and [0111] to be Optional Device Area for loading/unloading the magnetic tape 3 besides the essential Device Area shown in FIG. 7.

It is noted that the numbers indicated within ( ) in each column indicating the value of bit of the bit numbers (3-2-1-0) in the figure indicates the respective bit value in the decimal notation.

The tape streaming drive 10 can discriminate the running area, the detailed position within the area, the partition No. and others while reproducing or searching the magnetic tape 3 by recording the ID information as shown in FIG. 11 in each block on the magnetic tape.

6. Data Structure of MIC

Next, the data structure of the MIC 4 fitted in the tape cassette 1 will be explained.

Figure 12:
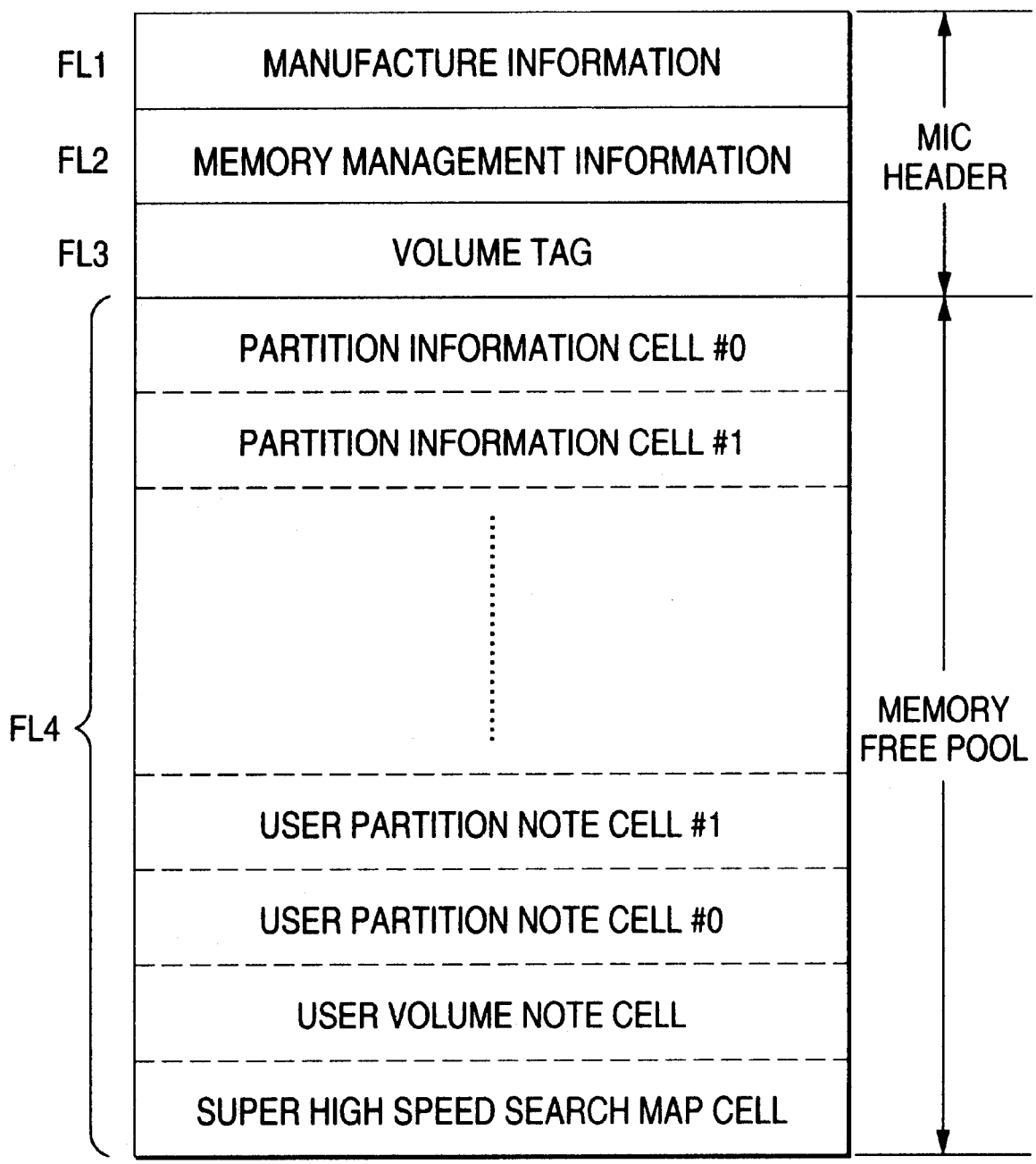
FIG. 12 is a table for explaining the structure of an MIC of the embodiment.

FIG. 12 is a schematic diagram showing one example of the structure of data stored in the MIC 4. Fields FL1 through FL4 are set as shown in the figure as storage areas of the MIC 4.

Various management information such as various information in manufacturing the tape cassette, tape information in initializing time and information per partition is written to these fields FL1 through FL4.

Field FL1 indicates Manufacture Information which is a manufacture part in which various information in manufacturing the tape cassette is mainly stored.

Field FL2 indicates Memory Management Information which is Drive Initialize Part in which information in initializing is mainly stored.

Field FL3 indicates Volume Tag in which fundamental management information of the whole tape cassette is stored.

Field FL4 is a memory free pool area in which management information may be stored additionally. A history of recording/reproducing operations and various information are stored/updated as necessary in this memory free pool. It is noted that one unit of data group stored in the memory free pool will be called as "cell" hereinafter.

At first, Partition Information Cells #0, #1, . . . which is management information corresponding to each partition are written sequentially from the head of the memory free pool corresponding to Partitions formed on the magnetic tape 3. That is, Partition Information Cells are formed as the same number of cells with the Partitions formed on the magnetic tape 3.

Super High Speed Search Map Cell as map information for high speed search is written from the side of the rear end of the memory free pool.

Following to that, User Volume Note Cell and User Partition Note Cell are written from the rear end side. User Volume Note Cell is information such as a comment inputted by the user concerning to the whole tape cassette, and User Partition Note Cell is information such as a comment inputted by the user concerning to each partition. Accordingly, these are stored when the user instructs to do so and are not necessarily described all the time.

Intermediate areas in which no such information is stored are left as they are as the memory free pool to be written later.

Manufacture Information of field FL 1 has the structure as shown in FIG. 13 for example. It is noted that a size (number of bytes) of each data is indicated on the right side.

In the manufacture information, checksum information on the data of the manufacture information is stored as manufacture part checksum at the first 1 byte. The information of this manufacture part checksum is given in manufacturing the cassette.

Then, information from MIC type (mic type) to Write Protect Data Byte Count is described as actual data composing the manufacture part. It is noted that Reserved indicates an area reserved for storing data in the future. The same applies to the explanation hereinbelow.

MIC type is data indicating a type of MIC actually fitted in the tape cassette concerned.

MIC manufacture date indicates the date (and time) when the MIC concerned was manufactured.

MIC manufacture line name indicates information on the name of a line on which the MIC was manufactured.

MIC manufacture plant name indicates information on the name of a factory in which the MIC was manufactured.

MIC manufacturer name indicates information on the name of a manufacturer of the MIC.

MIC name indicates information on the name of a vender of the MIC.

Cassette manufacture date, cassette manufacture line name, cassette manufacture plant name, cassette manufacturer name, cassette name describe information on the cassette itself similarly to the information on the MIC described above.

Information on the name of a customer company of OEM is stored in OEM customer name.

Information on physical characteristics of the magnetic tape such as the material, thickness and length of the tape is stored in physical tape characteristic ID.

Information indicating the maximum clock frequency dealt by the MIC concerned is stored in maximum clock frequency.

Maximum write cycle indicates information on unit of data length indicating that how many bytes of data may be transferred by one time of communication with the tape streaming drive 10 as the characteristic of the MIC. This information depends on the physical characteristics of a nonvolatile memory used as the MIC.

MIC capacity indicates information on a storage capacity of the MIC concerned.

Write protect start address is used to prohibit to write into a certain part of the area of the MIC and indicates a starting address of a write protected area.

Write protected data byte count indicates a number of bytes of the write protected area. That is, an area from the address specified by the write protect start address to the area occupied by the number of bytes indicated by the area of the write protect count is set as the write protected area.

Figure 14:
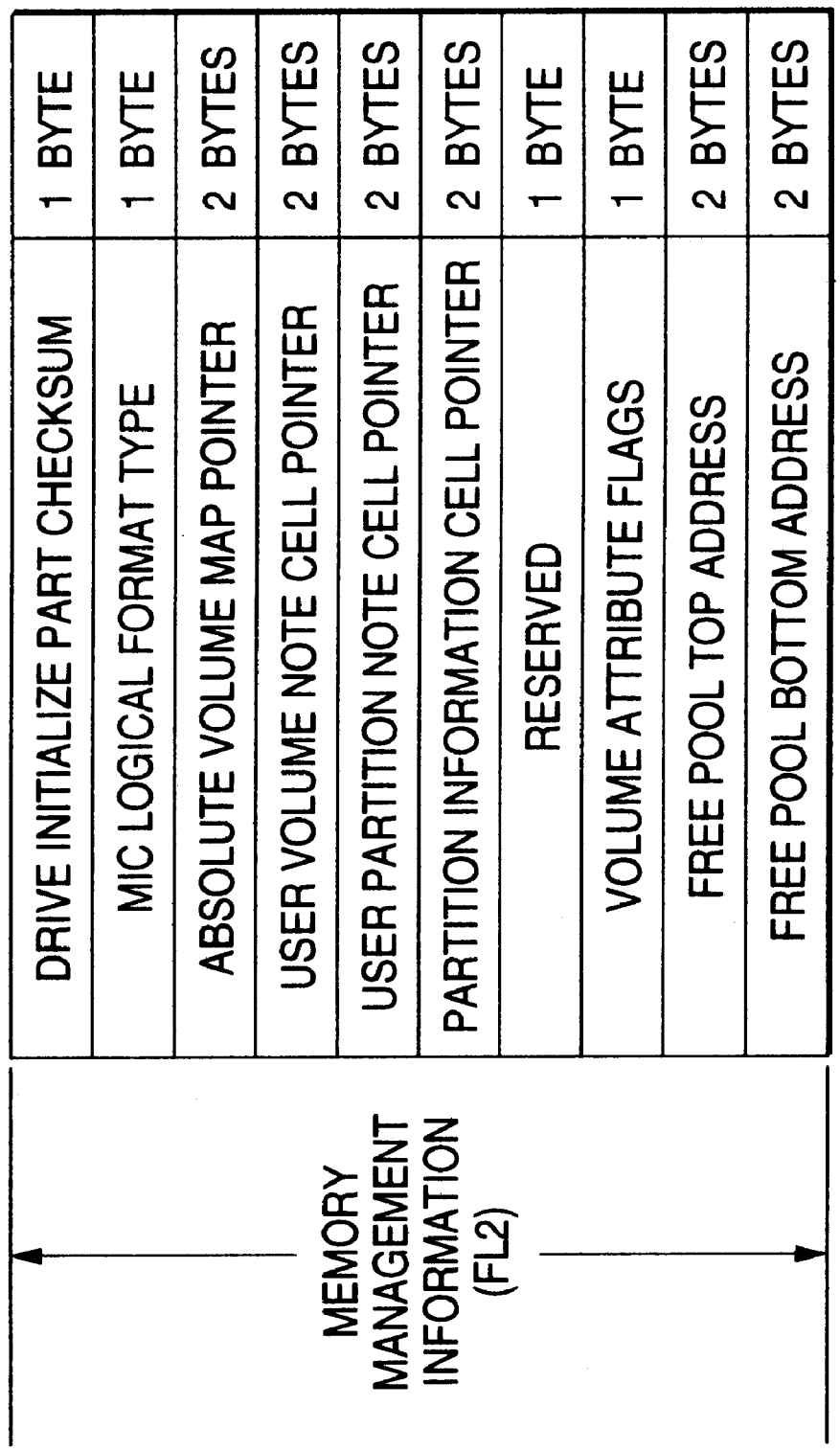
FIG. 14 is a table for explaining memory management information of the MIC of the embodiment.

Following to that, the structure of memory management information of field FL 2 in FIG. 12 will be explained with reference to FIG. 14. A size (number of bytes) of each data is indicated on the right side of the figure.

Information on checksum for data of the memory management information which is the drive initialize part is stored in the memory management information as Drive Initialize Part Checksum at first.

Then, information from MIC Logical Format Type to Free Pool Bottom Address is described as actual data composing the memory management information.

At first, an ID number of a logical format of the MIC is stored as MIC Logical Format Type. Besides the fundamental MIC format, there exit various MIC formats related to firmware update tape MIC format, reference tape MIC format and cleaning cassette MIC format. Then, ID number corresponding to the MIC format of the tape cassette concerned is indicated therein.

A pointer indicating the head address of the area of Super High Speed Search Map Cell is disposed in FIG. 12 in Absolute Volume Map Pointer.

User Volume Note Cell Pointer indicates a storage area from/to which the user can read/write freely to the tape cassette via the SCSI, i.e., the starting address of User Volume Note Cell shown in FIG. 12.

User Partition Note Cell Pointer indicates a storage area from/to which the user can read/write freely to each partition via the SCSI, i.e., the starting address of User Partition Note Cell in FIG. 12. It is noted that while there is a case where a plurality of User Partition Note Cells are stored, the User Partition Note Cell Point indicates the starting address of the head cell among the plurality of User Partition Note Cells.

Partition Information Cell Pointer indicates the starting address of Partition Information Cell #0 in FIG. 12.

While partition information written to the memory free pool is formed by a number of Partitions formed on the magnetic tape 3, all Partition Information Cells #0 through #N are linked by the pointer by the link structure. That is, the Partition Information Cell pointer is a route indicating the address of Partition #0 and the pointer of Partition Information Cell thereafter is disposed within the previous Partition Information Cell.

The position of each data is managed within the field FL 4 by the respective pointers (Absolute Volume Map Pointer, User Volume Note Cell Pointer, User Partition Note Cell Pointer and Partition Information Cell Pointer) as described above.

Volume Attribute Flags are one byte flags for providing logical write inhibit tab to the MIC 4. That is, the contents of the MIC header flag is write enable/inhibit of the manufacture part portion or is write enable/inhibit of a portion other than the manufacture part.

Free Pool Top Address and Free Pool Bottom Address indicate the starting and ending addresses of the memory free pool in the field FL 4 at that moment. Because the area as the memory free pool changes corresponding to data written or erased such as Partition Information and User Partition Note, Free Pool Top Address and Free Pool Bottom Address are updated corresponding to that.

Next, the structure of Volume Tag in field FL 3 in FIG. 12 will be explained with reference to FIG. 15. A size (number of bytes) of each data is shown on the right side of the figure.

Information on checksum for data of Volume Information in which fundamental management information of the whole tape cassette is stored is stored at the head of the Volume Tag as Volume Information Checksum.

Then, Volume Information is described following to that.

Further, information on checksum for data of Accumulative Partition Information in which history information from the manufacturing time of the tape cassette is stored is stored as Accumulative Partition Information Checksum.

Serial numbers of character information of 32 characters based on ASCII code for example are stored in Cartridge Serial Number following to Volume Note Checksum and Volume Note.

A code number of the manufacturer of the tape cassette 1 is stored in Manufacturer ID as a manufacturer identifier.

Secondary ID is a secondary identifier corresponding to the type of the tape cassette 1 in which attribute information of the tape is stored as a code value of 1 byte for example.

Cartridge Serial Number Part Checksum is checksum information of the Cartridge Serial Number, Manufacturer ID and Secondary ID described above.

Each area of Specific Volume Tags 1 through 13 is composed of 36 bytes as reserve for example.

Next, the cell stored in field FL 4 shown in FIG. 12 will be explained.

The field FL 4 is the area of the memory free pool as described above in which Partition Information Cells, User Partition Note Cells and others are stored sequentially. Then, the same type of cells, e.g., Partition Information Cells #1 through #N, are linked by Link Information explained next.

FIG. 16 shows the structure of each of these cells.

Figures 16A, 16B:
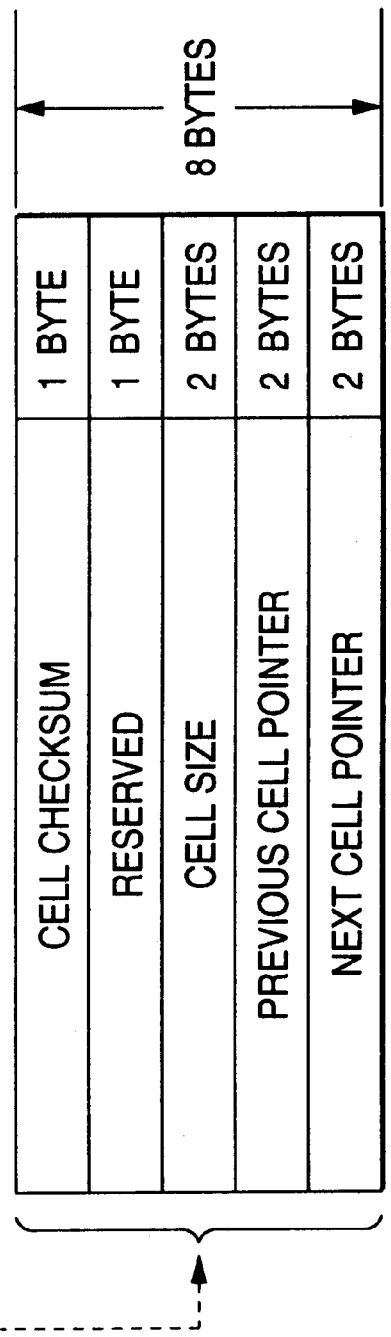
FIGS. 16A and 16B are tables for explaining the structure of a cell of the MIC of the embodiment.

One cell is composed of Link Information of 8 bytes and Data of n bytes (which differs depending on the type of a cell) as shown in FIG. 16A.

Link Information of 8 bytes is provided in each cell and has the structure as shown in FIG. 16B.

Cell Checksum of 1 byte is provided at first as a checksum concerning to data within the cell.

Further, the size of the cell is indicated as Cell Size of 2 bytes.

Previous Cell Pointer and Next Cell Pointer are actual linkage data (data configuring the link structure) and the previous and next cells are designated by the previous cell pointer and the next cell pointer in linking a plurality of cells of the same kind.

There exist Partition Information Cell, Super High Speed Search Map Cell, User Volume Note Cell and User Partition Note Cell as cells having such structure. Although the cell size of the Partition Information Cell is fixed, the cell size of the other cells is variable.

Next, the structure of Volume Information within field FL 3 in FIG. 12 will be explained.

While Volume Information of 100 bytes is described in Volume Tag of field FL 3, FIGS. 17A and 17B show the structure of this Volume Information.

Information on checksum for data of Volume Information is stored at the head of Volume Information as shown in FIG. 17A as Volume Information checksum of 1 byte.

Then, actual data composing this Volume Information, Eject Status of 20 bytes, Reel Diameter of 4 bytes, Initialize Count of 3 bytes and Volume Information on Tape of 72 bytes are described.

Data shown in FIGS. 18A and 18B are described as Eject Status of 20 bytes and Reel Diameter of 4 bytes.

They describe the position and state of the magnetic tape 3 in ejecting the tape cassette. As Eject Status, Absolute Frame Count, Partition ID, Group Count, Record Count, Save Set Mark Count and File Mark Count are described. That is, the identification information of Partitions (Partition ID) and various count values on the magnetic tape 3 in ejecting the tape cassette are stored.

As Reel Diameter, a numerical value of the S-reel diameter as the position of the magnetic tape in ejecting the tape cassette (diameter including the magnetic tape wound around the reel hub) is described by being divided into an integer part and a fraction part as Supply Reel Integer Part and Supply Reel Fraction Part in 1 byte each.

Similarly to that, a numerical value of the T-reel diameter as the position of the magnetic tape in ejecting the tape cassette is described by being divided into an integer part and a fraction part as Take Up Reel Integer Part and Take Up Reel Fraction Part in 1 byte each.

Initialize Count shown in FIG. 17A is information on a number of times. by which the magnetic tape 3 is initialized.

FIG. 17B shows the contents of Volume Information On Tape.

As shown in the figure, Super High Speed Search Enable Flag of 1 bit, System Log Allocation Flags of 2 bits, Always Unload PBOT Flag of 1 bit, AIT Native Flag of 1 bit, Last Valid Partition Number of 1 byte and Optional Device Area Allocation Map of 32 bytes are described in Volume Information ON Tape except of Reserved areas.

Super High Speed Search Enable Flag is a flag for indicating whether or not the function for speeding up high speed search further is effected by utilizing tape positional information stored as Absolute Volume Map of the MIC 4.

System Log Allocation Flags is a flag indicating the location where the history of usage (system log) of the tape cassette is stored. It is arranged so as to be able to discriminate the location of the system log whether it is recorded only on the magnetic tape 3, not recorded in the magnetic tape 3 nor the MIC 4, recorded in both magnetic tape 3 and the MIC 4 or recorded only in the MIC 4 for example.

Always Unload PBOT Flag is a flag indicating of unloading in Device Area existing in PBOT even when multipartitions are formed and there is Optional Device Area in the partition.

AIT Native Flag is a flag indicating a mode of the tape cassette 1.

Last Valid Partition Number indicates the number of the last formed partition.

Optional Device Area Allocation Map is composed of 256 bits and each 1 bit corresponds to the respective partitions formed on the magnetic tape 3. Then, when the value of the bit is '1', it indicates that Optional Device Area is formed in Partition corresponding to that bit.

While the data structure of the MIC 4 is constructed as explained above with reference to FIGS. 12 through 18, such data structure of the MIC 4 is merely an example to the end and the disposition of the data, the setting of the areas, the contents of the data, the data size and the like are not limited to those described above.

7. Position Detecting Method

By the way, the tape streaming drive 10 conducts the operation for detecting the tape position at each moment when the tape cassette 1 is charged or during the tape cassette running operation. That is, it detects the position where the tape is running between the tape top to the tape end at each moment.

It is noted that because the tape runs in the normal and reverse directions between the S-reel and the T-reel within the tape cassette, the tape position may be discriminated by the ratio of the reel diameters of the S-reel and the T-reel (ratio of the diameters when the tape is wound around the reel hubs).

An adequate operation may be realized by setting various parameters for servo control, e.g., by controlling a tape running mechanical system, based on the detected tape position. For instance, the control of the tape tension, control of running speed during search and control of the running speed around the tape top/tape end based on the detected tape position.

Further, the tape position as an unloading point is stored as the reel diameter within the MIC 4 in ejecting (tape unloading) the tape cassette as described later.

It is noted that the "reel diameter" in the present specification means the radius in the state in which the magnetic tape 3 is wound (the radius including the wound magnetic tape 3) and the "reel hub diameter" means the radius of the T-reel hub 2A or the S-reel hub 2B itself.

The detection of the tape position executed in the tape streaming drive 10 will be explained next.

While the detection of the tape position is an operation for detecting the running position of the magnetic tape 3 at each moment within the tape cassette 1, it is carried out as a reel diameter detecting operation because the tape position is actually considered to assume a value corresponding to the ratio of the reel diameters of the reel hubs 2A and 2B.

The tape position detecting method will be explained below.

At first, the detection of the tape position means to detect the ratio of reel diameters (or the reel diameters of the both reels) in the state in which the tape is wound around the both reel hubs.

An accurate and reliable method for calculating the reel diameter is to count a number of pulses from a capstan FG 27B while the reel hub makes one turn in the state in which the pinch roller 38 is pressed to the capstan 37 (pinch-on). Thereby, it is possible to detect the reel diameter accurately because the ratio of one turn of the reel hub and the number of pulses from the capstan FG is unchanged even if the capstan servo is disturbed by the external disturbance.

However, because the pinch roller 38 is not always pressed to the capstan 37, an arrangement must be made so that the tape position can be detected (the reel diameter can be detected) even in a mode in which the tape is run while the pinch roller 38 is released (pinch off).

In view of such matter, the following detecting method may be adopted.

Figure 19:
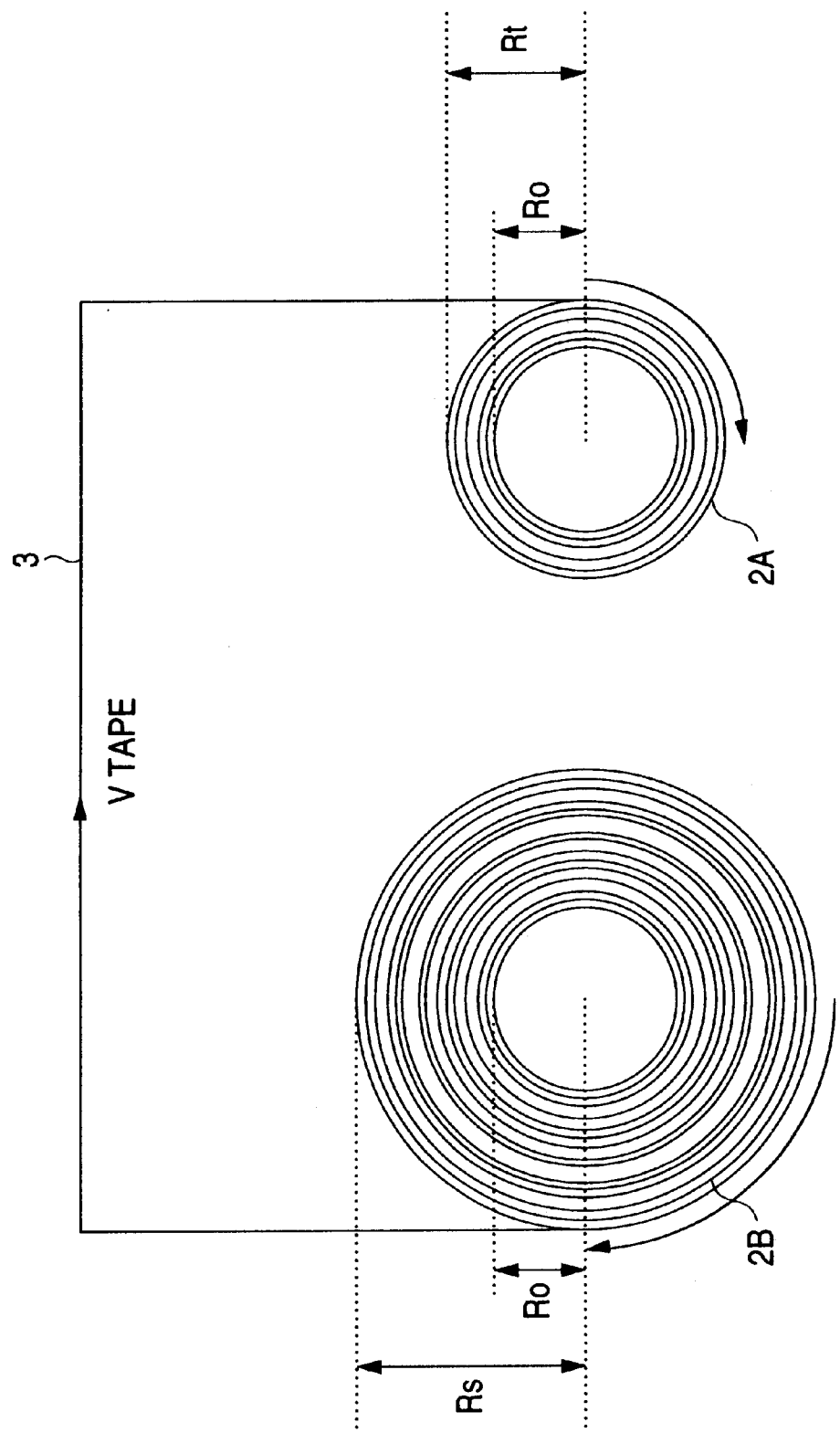
FIG. 19 is a diagram for explaining a reel diameter calculating operation of the embodiment.

FIG. 19 shows a state in which the magnetic tape 3 is run while being wound around the S-reel hub 2B and the T-reel hub 2A. Here, the reel diameter of the T-reel hub 2A is assumed as Rt, the reel diameter of the S-reel hub 2B as Rs, each reel hub diameter of the S-reel hub 2B and the T-reel hub 2A as Ro, the tape velocity as Vtape, the tape length as Ltape and the tape thickness as Dtape.

Naturally, the tape length Ltape and tape thickness Dtape are fixed for that tape cassette 1 (different depending on the type of the tape cassette 1) and accordingly, the sum of a projected area on the side of the S-reel hub and a projected area on the side of the T-reel hub in the state in which the tape 3 is wound around them is fixed regardless of the tape running position. Then, the following equation (1) holds:

$$\pi \cdot Rs^2 + \pi \cdot Rt^2 - 2 \cdot \pi \cdot Ro^2 = Ltape \cdot Dtape \quad (1)$$

That is, the area obtained by subtracting the projected area of the both reel hubs themselves from the sum of the projected area on the side of the S-reel hub and the projected area on the side of the T-reel hub in the state in which the magnetic tape 3 is wound around them corresponds to a projected area caused only by the tape length Ltape and tape thickness Dtape.

When the rotational cycle of the T-reel hub 2A is Tt and the rotational cycle of the S-reel hub 2B is Ts, the ratio of the reel diameter of the respective reel hubs may be found by measuring the respective rotational cycles Tt and Ts. Then, the following equation (2) holds:

$$Rs = Rt \cdot (Ts/Tt)$$

$$Rt = Rs \cdot (Tt/Ts) \quad (2)$$

Then, substituting the equation (2) into the equation (1) described above, one obtains the following equations:

$$\pi \cdot Rt^2 = \frac{Tt^2}{Ts^2 + Tt^2}(Ltape \cdot Dtape + 2 \cdot \pi \cdot Ro^2) \quad (3)$$

$$\pi \cdot Rs^2 = \frac{Ts^2}{Ts^2 + Tt^2}(Ltape \cdot Dtape + 2 \cdot \pi \cdot Ro^2)$$

In the equation (3), the tape length Ltape, the tape thickness Dtape and the reel hub diameter Ro are values intrinsic to the tape cassette 1. Accordingly, if the tape length Ltape, the tape thickness Dtape and the reel hub diameter Ro are known in advance, it is possible to detect the tape position (to detect the reel diameter of both reels or the ratio thereof) by measuring the rotational cycles Tt and Ts of the respective reel hubs.

Then, the tape is run while pressing the pinch roller 38 right after when the tape cassette 1 is charged and the tape is loaded to measure the tape total amount. The tape total amount is the total projected area caused by the whole length of the tape and the both reel hubs, i.e., a value of (tape length Ltape×tape thickness Dtape+sum of projected areas of both reel hubs $2\pi(Ro^2)$. It corresponds to the coefficient on the right side of the equation (3).

When the diameter of the capstan 37 is ($\phi$c, a counted number of pulses from the capstan FG 27B while the T-reel hub 2A makes one turn is Nt and a counted number of pulses from the capstan FG 27B while the S-reel hub 2B makes one turn is Ns, the relationship among the reel diameters Rt and Rs, ($\phi$c, Nt and Ns turns out as shown in the following equations (4) and (5):

$$Rs = \frac{Ns \cdot \phi c}{720} \quad (4)$$

$$Rt = \frac{Nt \cdot \phi c}{720} \quad (5)$$

It is noted that the time when the reel hub makes one turn is measured to cancel the fluctuation of FG of the reel FG.

When they are reduced by substituting into the equation (1) described above, the following equation is obtained:

$$\frac{\pi \cdot \phi c^2}{518400}(Ns^2 + Nt^2) = Ltape \cdot Dtape + 2 \cdot \pi \cdot Ro^2 \quad (6)$$

The right side of the equation (6) corresponds to the projected area of the both reel hubs and the whole length of the tape, i.e., the tape total amount described above. The value of this tape total amount is a value intrinsic to the tape cassette 1 and is unchanged until when the tape cassette 1 is ejected.

That is, it is possible to discriminate the tape total amount by obtaining count values Nt and Ns of the capstan FG pulses in the period of one turn of each reel by running the tape right after loading the tape.

It is noted that the servo controller 16 stores the data of this tape total amount by reducing the equation (6) to the following equation (7) and by setting $(Nt^2 + Ns^2)$=reference value A:

$$Ns^2 + Nt^2 = \frac{518400}{\pi \cdot \phi c^2}(Ltape \cdot Dtape + 2 \cdot \pi \cdot Ro)^2 \quad (\equiv A) \quad (7)$$

Then, the tape position is calculated as explained below by using this reference value.

The tape position is calculated as follows in case of pinch-on. It is possible to find the reel diameters Rt and Rs by counting the number of FG pulses Nt and Ns from the capstan FG 14B.

It is noted that although this may be found from the equations (4) and (5), it may be calculated by the following method by storing the reference value A in advance.

Although there is a possibility that the reel hub on the pulling side is disturbed in winding the tape by some disturbance, the reel hub on the pulled side operates almost steadily in case of the drive by the capstan.

Then, pulses of an S-reel FG 27D on the side of the S-reel hub 2B which is to be pulled in running the tape in the normal direction (forward direction) in the pinch-on state are counted. When running the tape in the opposite direction (reverse direction) in the pinch-on state on the other hand, pulses of a T-reel FG 27C on the side of the T-reel hub 2A which is to be pulled at this time are counted. Then, pulses of the capstan FG in that one rotational period (Nt or Ns) are counted by detecting one rotational period of the reel hub to be pulled from the pulses of the reel FG of the side to be pulled. Then, the counted value (Ns or Nt) of the capstan FG pulses in one rotational period of the pulling side reel hub may be found by calculation.

That is, it turns out as follows because the sum of squares of the counted values Ns and Nt of the capstan FG pulses is constant as it is apparent from the equation (7):

$$Nt^2 = A - Ns^2 \equiv At(\pi \cdot Rt^2)$$

$$Ns^2 = A - Nt^2 \equiv As(\pi \cdot Rs^2) \quad (8)$$

It is noted that $Nt^2$ and $Ns^2$ are data corresponding to the projected area, $Nt^2$ will be expressed as At and $Ns^2$ as As hereinbelow for the purpose of explanation.

Further, because the counted values Ns and Nt of the capstan FG pulses are proportional to the reel diameters Rs and Rt, they are considered to be equivalent to the reel diameters Rs and Rt. Accordingly, the servo controller 16 handles the counted values Ns and Nt as the reel diameters Rs and Rt therein. The data Ns corresponding to the reel diameter will be expressed as Bs and Nt as Bt hereinbelow for the purpose of explanation.

Then, the values corresponding to the actual reel diameters are found by calculating the square root as shown in the following equation (9) about the counted values Ns and Nt obtained as described above:

$$Nt = \sqrt{A - Ns^2} \equiv Bt(Rt)$$

$$Ns = \sqrt{A - Nt^2} \equiv Bs(Rs) \quad (9)$$

The actual reel diameters Rt and Rs may be found by the following equation (10) from the equations (5) and (9) described above:

$$Rt = \sqrt{A - Ns^2}/\phi c \cdot 720$$

$$Rs = \sqrt{A - Nt^2}/\phi c \cdot 720 \quad (10)$$

The tape position (projected areas At, As, reel diameters Bt and Bs) in running the tape in pinch-on may be found as described above.

Next, a method for calculating the tape position in running the tape in the state of pinch-off will be explained.

If the capstan FG pulses may be counted even in the pinch-off state and the tape running speed is constant, the following equation (11) holds:

$$Ns = Nt \cdot (Ts/Tt)$$

$$Nt = Ns \cdot (Tt/Ts) \quad (11)$$

Substituting the equation (11) into the equation (8), it may be reduced as follows:

$$Nt^2 = \frac{Tt^2}{Ts^2 + Tt^2} \cdot A \equiv At(\propto \pi \cdot Rt^2) \quad (12)$$

$$Ns^2 = \frac{Ts^2}{Ts^2 + Tt^2} \cdot A \equiv As(\propto \pi \cdot Rs^2)$$

It will be understood based on this equation (12) that the tape position (projected areas At, As, reel diameters Bt and Bs) may be calculated by measuring one rotational period of the respective reel hubs from the reel FG pulses.

However, because this equation presupposes that the tape speed is constant, such tape position detecting method cannot be executed during acceleration and deceleration (the tape position may be detected even during acceleration and deceleration by the calculating method described above in case of pinch-on).

The value corresponding to the reel diameters may be found by calculating the square root in the same manner as the case of pinch-on described above:

$$Nt = \sqrt{\frac{Tt^2}{Ts^2 + Tt^2} \cdot A} \equiv Bt(\propto Rt) \quad (13)$$

$$Ns = \sqrt{\frac{Ts^2}{Ts^2 + Tt^2} \cdot A} \equiv Bs(\propto Rs)$$

The actual reel diameters Rt and Rs may be found by the following equation (14):

$$Rt = \sqrt{\frac{Tt^2}{Ts^2 + Tt^2} \cdot \frac{(Ltape \cdot Dtape + 2 \cdot \pi \cdot Ro^2)}{\pi}} \quad (14)$$

$$Rs = \sqrt{\frac{Ts^2}{Ts^2 + Tt^2} \cdot \frac{(Ltape \cdot Dtape + 2 \cdot \pi \cdot Ro^2)}{\pi}}$$

The tape position is detected in running the tape in cases of pinch-on and pinch-off as described above in the present embodiment.

The servo controller 16 executes the calculation for detecting the tape position.

It is noted that although the reference value A has been calculated as described above based on the tape total amount, the reference value A may be calculated from the values of tape length and tape thickness read from the MIC 4 when it is possible to read the tape length and tape thickness from the MIC 4 and the reliability of the data is high.

The tape position is detected by the method described above right after when the tape cassette 1 is charged and the tape is loaded. The tape position is detected from time to time to be judged always accurately and the control is made precisely by using the data of tape position during the various operations involved with running of the tape such as recording, reproduction and search.

Still more, the reel FG pulses and the capstan FG pulses are counted from the moment when the tape position is detected and the value of the tape position detected accordingly is incremented/decremented even during the period in which no calculation for detecting the tape position is carried out, so that the servo controller 16 always grasps the running position of the magnetic tape 3.

It is noted that the servo controller 16 executes the tape position detecting operation at the time when the system controller 15 issues a request to.

When the reference value A is calculated once in the loading process, it need not be calculated again in the operation for detecting the tape position thereafter by storing it.

The calculation of the tape position data carried out by the servo controller 16 is executed by the calculating method at the time of pinch-on described above when it is instructed while running the tape in the state of pinch-on, and is executed by the calculating method at the time of pinch-off described above when it is instructed while running the tape in the state of pinch-off.

8. Unloading Operation

Next, an operation in unloading the magnetic tape 3 to eject the tape cassette 3 will be explained as a distinguishing operation of the present embodiment.

When a plurality of partitions are set in the tape cassette fitted with the MIC 4, it is possible to load/unload in unit of partition. That is, it is possible to load/unload not only in Device Area at the tape top but also in Optional Device Area of each partition.

Figure 20:
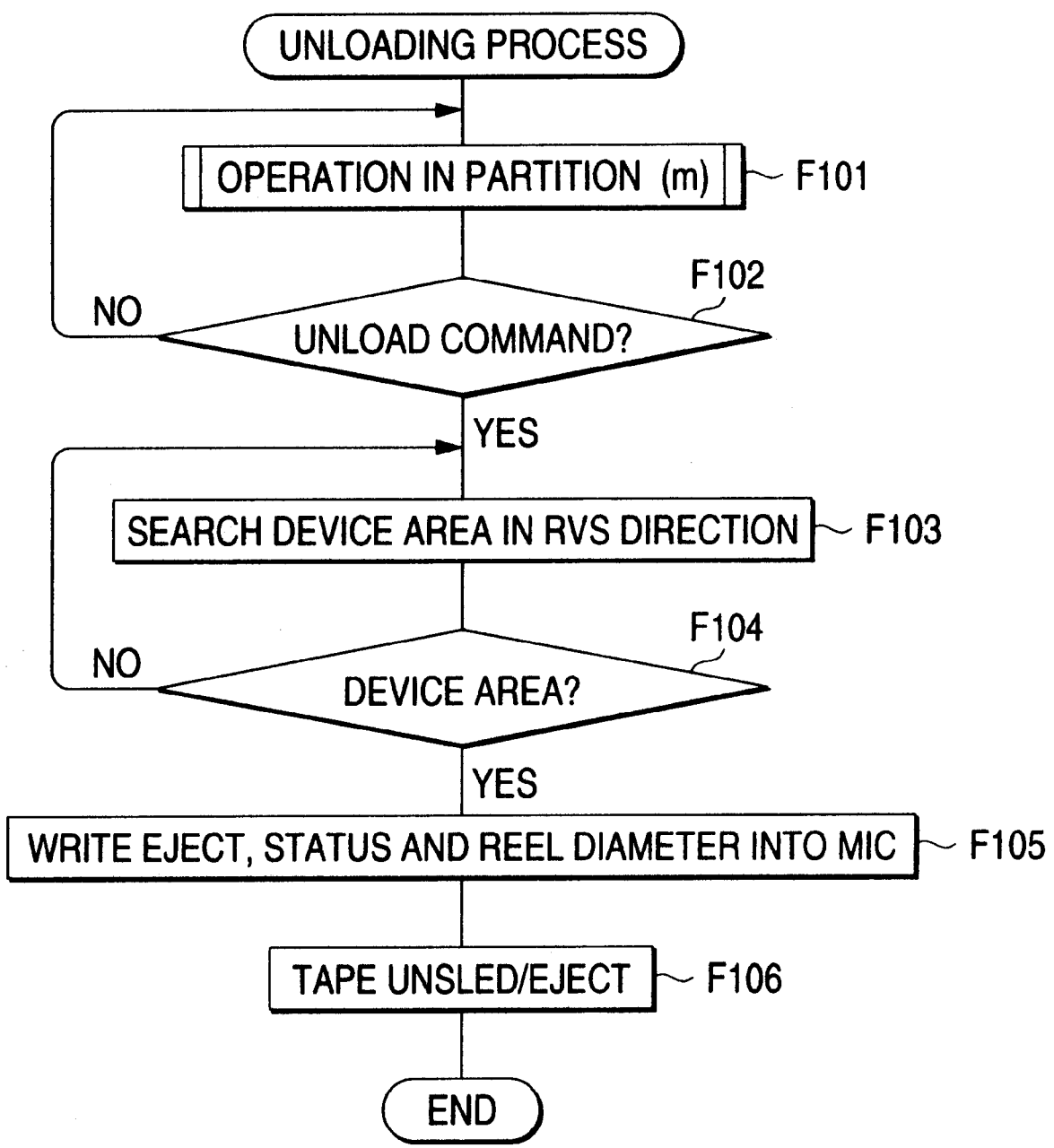
FIG. 20 is a flowchart of processes during an unloading operation of the embodiment.
Figure 21:
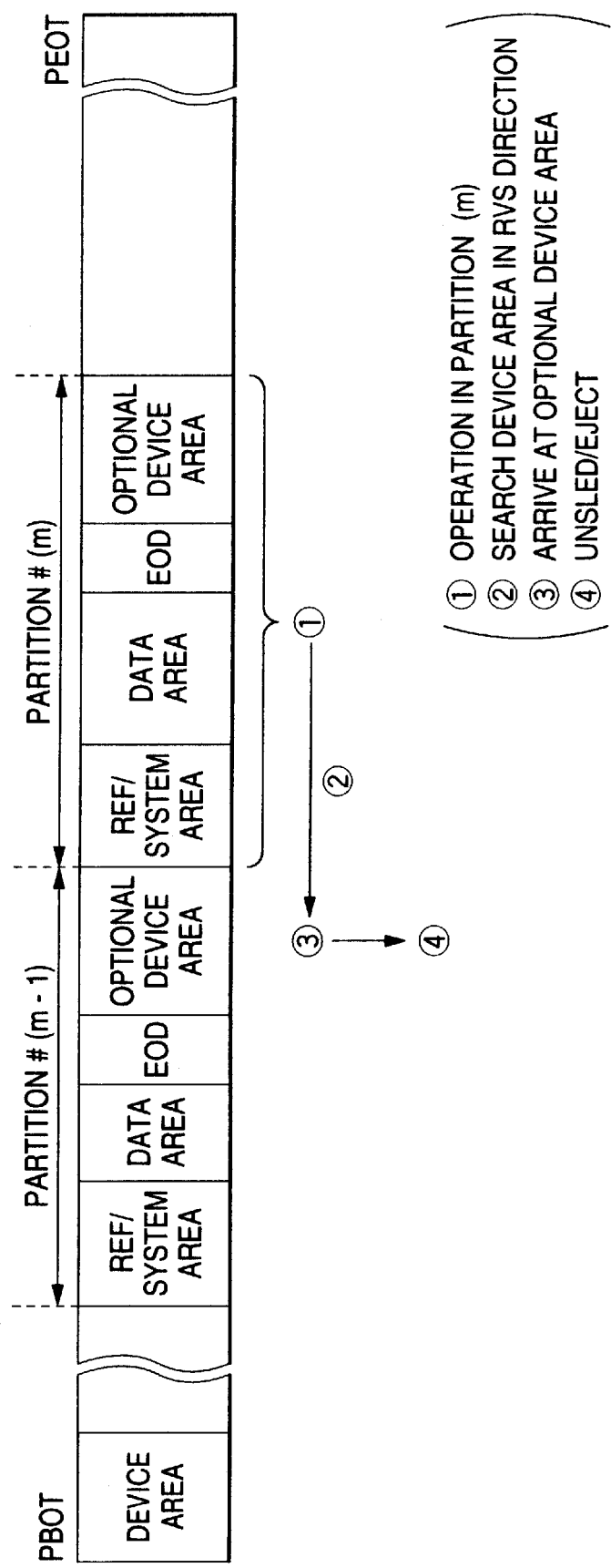
FIG. 21 a diagram for explaining the unloading operation of the embodiment.

FIG. 20 shows a control process executed by the system controller 15 in ejecting the tape cassette 1 during operation in Partition #m and FIG. 21 diagrammatically shows its operation.

Consider unloading from the state in which a recording/reproducing process is executed in Partition #m on the magnetic tape 3 as shown in FIG. 21 (hereinafter, Partition currently used as an object of recording or reproduction will be expressed as active Partition).

The process for executing this Partition #m as active partition is Step F101 in FIG. 20. The position of the magnetic tape 3 is located anywhere within Partition #m as indicated as (1).

When an eject command is supplied from the host computer 40 to the system controller 15 based on a manipulation of the user, the process of the system controller 15 advances from Step F102 to Step F103.

At first, the system controller 15 issues an instruction to the servo controller 16 to run the magnetic tape 3 in the reverse direction to search Device Area (or Optional Device Area). Device Area and Optional Device Area are the areas set as the loading/unloading position as described before.

The tape is run in the reverse direction as indicated as (2) in FIG. 21 for example.

Then, Optional Device Area at the rear end of Partition #(m-1) is reached as indicated as (3) by the search (2). It is noted that the system controller 15 discriminates the area of the current running position of the magnetic tape 3 by reading the data of ID area explained in FIGS. 8 through 11.

Reaching Optional Device Area as indicated as (3) (Device Area when Partition #0 is active), the system controller 15 advances the process from Step F104 to Step F105 to write the data of Eject Status and Reel Diameter described above to the MIC 4. That is, it updates the information on the reel diameter which becomes information as the unloading position.

Here, the reel diameter becomes the tape positional information corresponding to Optional Device Area and information on Partition ID within Eject Status becomes information for discriminating Partition (m-1). That is, the value read from ID area on the magnetic tape (see FIGS. 8 through 11) is stored in the MIC 4 as Partition ID within Optional Device Area.

It is noted that as for the value of the reel diameter, although it may be held always as the servo controller 16 increments/decrements the values measured before corresponding to the FG pulse count, it is possible to arrange so as to measure again at the point of time reaching Optional Device Area.

After ending the above process as Step F105, the system controller 15 unsleds the magnetic tape 3 from the rotary drum 11 by the loading motor 14E and ejects the tape cassette 1 by driving an eject motor 28 in Step F106 ((4) in FIG. 21).

The tape cassette 1 is ejected in Optional Device Area just before Partition #m and in the state in which Eject Status and the information on reel diameter indicating that position is written to the MIC 4 by unloading from the state in which Partition #m has been active by the processes described above.

Further, when the active Partition is not Partition #0, the unloading is carried out in Optional Device Area other than Device Area at the tape top, i.e., the tape cassette is ejected without being rewound to the tape top, by the processes described above.

9. Loading Operation

Next, as against the unloading process described above, a loading process in charging the tape cassette 1 will be explained.

Figure 22:
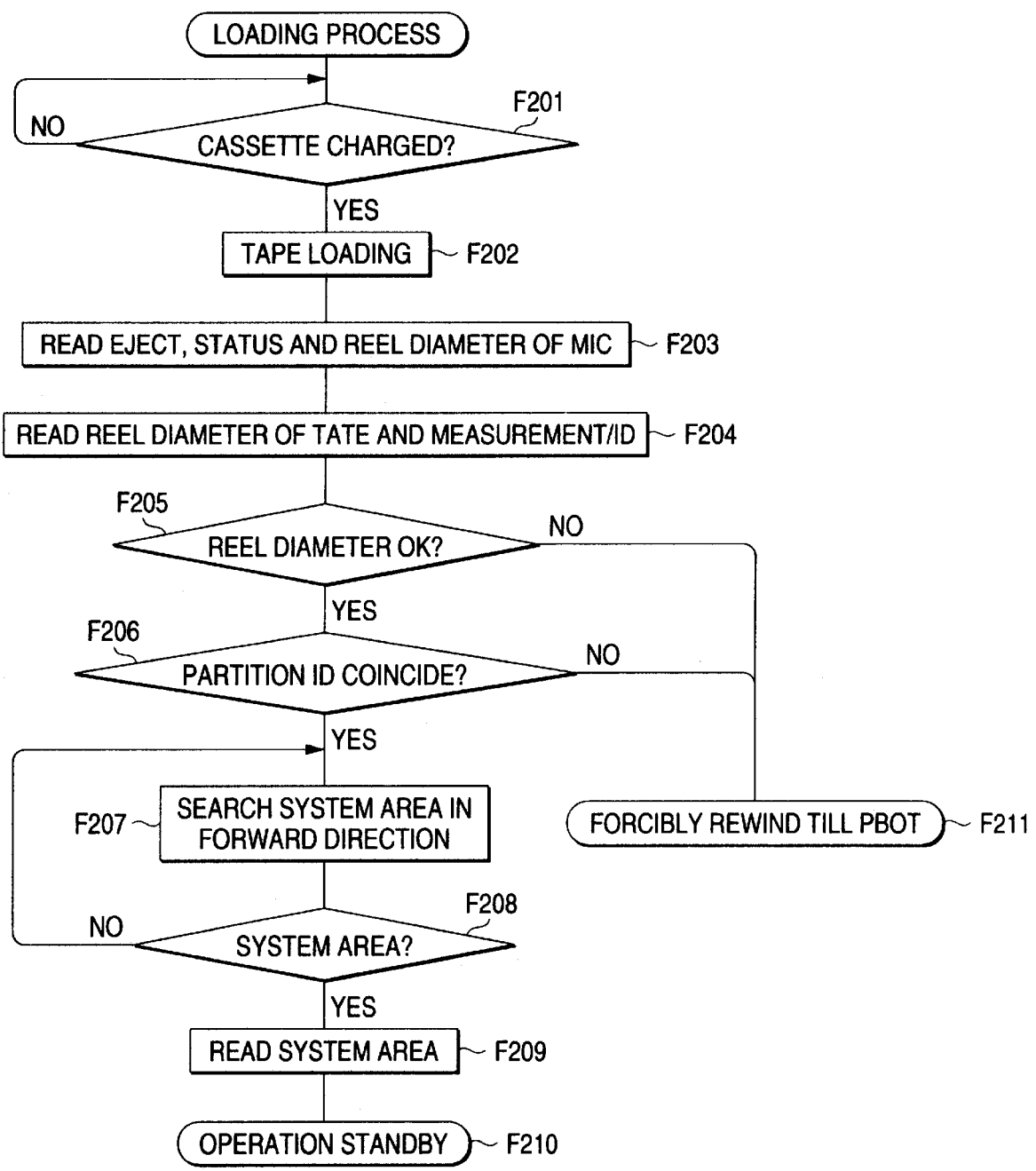
FIG. 22 is a flowchart of processes during a loading operation of the embodiment.
Figure 23:
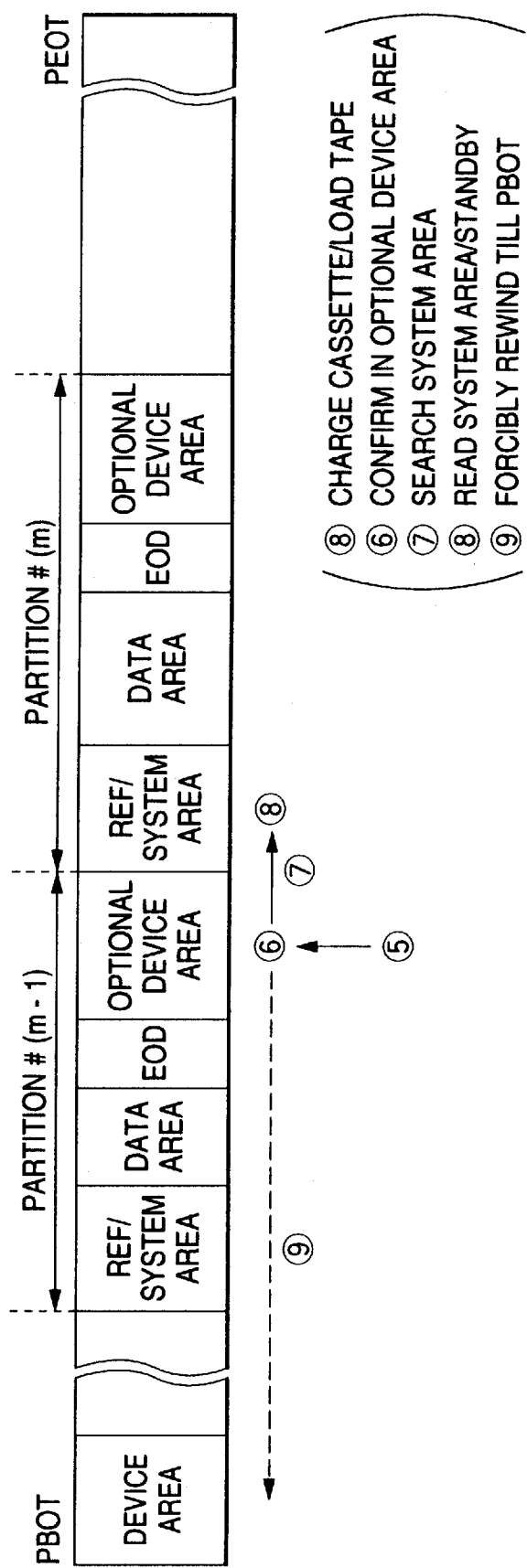
FIG. 23 is a diagram for explaining the loading operation of the embodiment.

FIG. 22 shows a control process executed by the system controller 15 in charging the tape cassette 1 and FIG. 23 diagrammatically shows its operation.

When the tape cassette 1 is charged as indicated as (5) in FIG. 23 and a sensor 29 detects that it is seated (Step F201), the process of the system controller 15 advances from Step F201 to Step F202 in FIG. 22 to drive the loading motor 14E to wind the magnetic tape 3 around the rotary drum 11. That is, the tape loading operation is carried out.

Next, the system controller 15 reads the necessary management information from the MIC 4 of the tape cassette 1 in Step F203. It reads at least Volume Information especially in case of the present embodiment to take in data of Eject Status (Partition ID within Eject Status) and the reel diameter.

It then causes the servo controller 16 to execute the measurement of the position of the magnetic tape at the point of time when the tape is loaded in Step F204. For instance, it causes the servo controller 16 to run the tape at least by one rotational period of the reel to measure the tape position, i.e., the reel diameter, by the tape position detecting method described above. It also reads data of ID area as data on the track read from the reproducing heads 13A and 13B at this time to take in especially Partition ID recorded in the ID area.

Then, it confirms whether or not the value of the reel diameter stored in the MIC 4 coincides with the value of the reel diameter measured in Step F204 within a certain degree of allowance in Step F205.

When it is confirmed that the reel diameters coincide, the system controller 15 confirms in Step F206 whether or not the value of Partition ID stored in the MIC 4 coincides with the value of Partition ID read in Step F204. For instance, when the unloading operation is executed from the state in which Partition #m has been active by the process described above, each Partition ID must be detected to coincide as Partition #(m-1) in Step F206.

By confirming that the reel diameters and Partition IDs coincide by the processes up to Step F206 ((6) in FIG. 23), it is confirmed that the tape cassette 1 is loaded at the correct position since when it has been ejected previously. Then, the system controller 15 advances the process to Step F207 to cause the servo controller 16 to execute the operation for searching System Area in the forward direction. That is, the magnetic tape 3 is run in the forward direction as indicated as (7) in FIG. 23 to search System Area of the Partition which has been active before, i.e., of Partition #m.

Thereafter, when the running of the magnetic tape 3 reaches System Area, the process is advanced from Step F208 to Step F209 to take in data of System Area read by the reproducing heads 13A and 13B ((8) in FIG. 23).

Then, after completing to read, the system controller 15 waits for the actual operation in Step F210 by setting the position of the magnetic tape 3 within System Area. That is, it becomes possible to record/reproduce in Partition #m.

After that, the recording/reproducing operation to the magnetic tape 3 is executed corresponding to a command issued from the host computer 40 based on the manipulation of the user, the application program and the like.

By the way, when it is not confirmed that the reel diameters and Partition IDs coincide in Step F205 or 206, it is the case when the tape cassette 1 is not loaded correctly at the previous unloading position. Or, there is a possibility that an error is produced in the data of the MIC 4.

It is not adequate to continue the operation as it is in such cases, so that the system controller 15 advances the process to Step F211 to forcibly rewind the magnetic tape 3 to the tape top (PBOT) ((9) in FIG. 23).

Thereby, the position of the magnetic tape is correctly confirmed as the tape top and the operations thereafter are carried out. For instance, System Area is searched in the forward direction after rewinding the magnetic tape 3 to the tape top and System Area is reached, the loading is completed at that position. That is, the magnetic tape 3 is loaded always in System Area of Partition #0 in this case.

It is also conceivable to recommend the user to replace the tape cassette as End with Error or Non-operational when a serious defect such as a failure of the MIC 4 is confirmed.

The adequate recording/reproducing operation may be realized even in executing the loading/unloading operation on the way of the tape by confirming whether or not the loading position is adequate during the loading as described above.

Accordingly, the present embodiment allows the tape cassette to be ejected or replaced in a short time and the reliability as a data storage system to be improved by loading/unloading on the way of the tape.

Although the embodiment of the present invention has been described, the invention is not limited to the structures and operations shown in the respective figures explained so far and the formats and processing operations of the tape cassette, the tape streaming drive and data to be stored in the MIC may be appropriately changed corresponding to the actual use conditions and the like.

In particular, various modifications are conceivable for the contents and procedures of the processes in FIGS. 20 and 22. For instance, although the coincident confirming processes of Steps F205 and F206 are carried out in FIG. 22, it is conceivable to carry out only one of them.

Further, the 8 mm VTR tape cassette fitted with the nonvolatile memory for recording/reproducing digital signals and the recording/reproducing system comprising the tape streaming drive corresponding to the tape cassette have been explained as the embodiment described above, the invention is not limited to them and is also applicable to a recording/reproducing system capable of recording/reproducing information of image signals and sound signals as digital signals.

Accordingly, it should be understood that variations to the embodiment described above will occur to those skilled in the art within the scope of the present inventive concepts which are delineated by the following claims.

What is claimed is:

1. A tape driving apparatus accommodating a tape cassette fitted with a magnetic tape and a memory for recording management information for managing operations relating to recording/reproducing to/from said magnetic tape that is divided into partitions along a length thereof, wherein the management information in said memory contains information on tape position at a time of a previous ejection from said tape driving apparatus, said apparatus comprising:

tape driving means for running said magnetic tape in said tape cassette and for recording/reproducing information to/from said magnetic tape being run;

memory driving means for reading/writing management information from/to said memory in said tape cassette;

tape position detecting means for detecting first tape position information of said magnetic tape which is run by said tape driving means; and control means for causing said memory driving means to read second tape position information at a time of a previous ejection as said management information from said memory, for causing said tape position detecting means to detect said first tape position information, and for comparing said first and second tape position information and controlling the recording/reproducing operation to/from said magnetic tape after said tape cassette is loaded based on a comparison, wherein said tape position information comprises first partition discriminating number information taken from a partition directly preceding a partition whereat the previous ejection occurred and first information on respective diameters of reels within said tape cassette, and said magnetic tape is wound around said reels, wherein said control means causes said memory driving means to read from said memory the first partition discriminating number information at a time of the previous ejection when said tape cassette is loaded, causes said tape driving means to read second partition number discriminating information from said magnetic tape and to compare said first and second partition number discriminating information and controls said tape driving means to drive said magnetic tape after said tape cassette has been loaded to obtain second information on respective diameters of reels within said tape cassette and based on both a positive comparison result of the first and second partition discriminating number information and a positive comparison of said first and second tape position information on respective diameters of the reels, said control means controls the recording/reproducing and operation to/from said magnetic tape of said loaded tape cassette.

2. The tape driving apparatus according to claim 1, wherein said control means causes said tape driving means to drive said magnetic tape to a starting end position based on at least either comparison result of the comparison of said first and second partition discriminating information or the comparison result of the comparison of said first and second tape position information.

* * * * *